US012589607B2

(12) United States Patent
Nakash et al.

(10) Patent No.: US 12,589,607 B2
(45) Date of Patent: Mar. 31, 2026

(54) PRINTING PROCESSES FOR PRODUCING TEXTURED IMAGES

(71) Applicant: NUR INK INNOVATIONS LTD, Rosh ha-Ayin (IL)

(72) Inventors: Moshe Nakash, Herzliya (IL); Sivan Marcus, Rishon le Zion (IL); Eyal Brauner, Tel Aviv (IL); Ron Lefkovits, Tel Aviv (IL); Moshe Nur, Magshimim (IL)

(73) Assignee: NUR INK INNOVATIONS LTD, Rosh Ha-Ayin (IL)

( * ) Notice: Subject to any disclaimer, the term of this patent is extended or adjusted under 35 U.S.C. 154(b) by 21 days.

(21) Appl. No.: 18/576,802

(22) PCT Filed: Aug. 10, 2023

(86) PCT No.: PCT/IL2023/050835
§ 371 (c)(1),
(2) Date: Jan. 5, 2024

(87) PCT Pub. No.: WO2024/033926
PCT Pub. Date: Feb. 15, 2024

(65) Prior Publication Data

US 2025/0091377 A1 Mar. 20, 2025

Related U.S. Application Data

(60) Provisional application No. 63/370,979, filed on Aug. 10, 2022.

(51) Int. Cl.

| | |
|---|---|
| ***B41M 3/06*** | (2006.01) |
| ***B41M 3/18*** | (2006.01) |
| ***B41M 5/00*** | (2006.01) |
| ***B41M 7/00*** | (2006.01) |
| ***C09D 11/322*** | (2014.01) |
| ***C09D 11/38*** | (2014.01) |
| ***C09D 11/54*** | (2014.01) |

(52) U.S. Cl.
CPC ................ *B41M 3/06* (2013.01); *B41M 3/18* (2013.01); *B41M 5/0017* (2013.01); *B41M 7/009* (2013.01); *C09D 11/322* (2013.01); *C09D 11/38* (2013.01); *C09D 11/54* (2013.01)

(58) Field of Classification Search
CPC .................................................... B41M 5/0017
See application file for complete search history.

(56) References Cited

U.S. PATENT DOCUMENTS

| | | | | |
|---|---|---|---|---|
| 6,764,725 B2 * | 7/2004 | Engle | B41M 7/0036 428/32.3 |
| 9,376,582 B1 * | 6/2016 | Dannhauser | C09D 11/54 |
| 2009/0252925 A1 * | 10/2009 | Provoost | B44C 3/025 428/151 |
| 2018/0056671 A1 | 3/2018 | Boniface | |
| 2021/0299939 A1 | 9/2021 | Ushigome | |

FOREIGN PATENT DOCUMENTS

| | | |
|---|---|---|
| EP | 3738782 A1 | 11/2020 |

* cited by examiner

*Primary Examiner* — Ian A Rummel
(74) *Attorney, Agent, or Firm* — FISHERBROYLES, LLP; Roger L. Browdy; James E. Mrose

(57) ABSTRACT

The technology generally concerns methods for forming 2.5D images on a substrate.

24 Claims, 4 Drawing Sheets

PRINTING PROCESSES FOR PRODUCING TEXTURED IMAGES

TECHNOLOGICAL FIELD

The invention generally contemplates environmentally friendly (green) water-based ink compositions and processes for forming 2.5D images.

BACKGROUND OF THE INVENTION

The size of the existing wallpaper market is estimated based on the size of the overall housing market, the average size of houses, the number of rooms/walls in the houses, and the proportion of walls covered in wallpaper. The size of the market grows annually and new consumers buy wallpaper, some in "DIY" shops, and some in specialist shops; on average wallpapers are renewed once or twice every five years. The increasing demand for interior design and renovations, together with the increase in disposable income, have increased consumer demand for relatively low-cost wallpapers which play their part in allowing for personal and unique style choices within redesigned spaces.

Wallpaper manufacturers interested in increasing the market share of wallpaper and in providing better solutions for the developing market needs, both from design, logistic and regulatory (environmentally friendly chemical) perspectives, revert to known technologies for producing a vast array of wallpapers designs that can meet rising demands for different coloring, textures and designs.

GENERAL DESCRIPTION

With the goal being to continue and encourage consumer use of wallpaper, and other textured surfaces, such as tabletops, there has been a rise in production trends. Traditionally, such trends include a greater availability of a broader range of design-options and more innovative textures. However, the move towards personalized designs in smaller quantities, and to using ecological and environmentally friendly inks, requires a different approach.

The need to provide environmentally friendly wallpapers and textured surfaces that do not emit volatile organic compounds (VOCs) over time, has been met by the technology disclosed herein, which generally provides small-scale as well as large-scale industrial processes and suitable environmentally friendly water-based ink compositions. The textured designs presenting a flat-surface visual, that is in fact non-flat to the touch, are regarded herein as "2.5D printed patterns" or 2.5D designs or 2.5D images that are physically and chemically robust over time and which allow for a significantly improved end product, both in their look and feel.

As known in the art, 2.5D printing involves sequential deposition of thin material layers of solidified ink for achieving a textured flat substrate. Basically, the 2.5D printing technique involves multiple layers of ink, which are printed on various flat, rigid or flexible surfaces to form a pattern or a texture that is up to 2 mm in thickness. This texture has a decorative effect, with the small, raised ink deposits forming full-color patterns across the printed area. Unlike 3D printing, 2.5D printing enables use of a vast range of colors and a high-resolution print of 600 dpi or higher.

2.5D products, images or patterns are substantially two dimensional, having pattern thicknesses that are typically in the sub-millimetric range. This requires the printing protocols to substantially vary from those used in 3D printing, particularly in view of the delicate structures and patterns formed and the relatively fine features that need to be expressed both visually and texturally.

As disclosed herein, processes of the invention may be used for generating textured surfaces per demand, by an end user, and may also be scaled up to industrial volumes by utilizing existing inkjet techniques and inkjet systems. As the 2.5D inkjet printing technology enables suppliers to custom print both a desired hue/color and texture/pattern to meet a customer's demand, the suppliers will be able to dramatically reduce the number and types of wallpaper or surface designs held in stock (to <50) and maintain a readiness to furnish products per client's demands.

Thus, in a first of its aspects, the invention provides a digital inkjet printing process for forming a textured pattern on a surface region of a substrate, the process comprising layer-by-layer deposition by inkjet printing of a water-based ink, e.g., a water-based inkjet ink, to form a layered pattern comprising a plurality of material layers structured to adopt a preselected design; and optionally color patterning at least a part of said design with a water-based ink formulation. As disclosed herein, the layered pattern is not a 3D pattern.

The invention further provides a digital inkjet printing process for forming a 2.5D pattern on a surface region of a substrate, the process comprising depositing by inkjet printing a water-based colored ink formulation on a substrate having a recipient surface region to thereby form a layered 2.5D pattern comprising a plurality of material layers structured to adopt the 2.5D pattern with a preselected design; wherein

- the water-based ink formulation optionally containing a pigment,
- the 2.5D pattern having a thickness of no more than 2 mm, or no more than 1 mm, or no more than 0.5 mm, or a thickness that is micron in size, and wherein
- the process does not comprise deposition of UV-based ink formulations or UV-irradiation steps.

As noted herein, the 2.5D pattern is formed on a substrate by sequential deposition of water-based formulations to provide a plurality of substantially stacked material layers. Each of the layers having a thickness of between 0.2 nm and 35 microns or between 1 and 35 microns, depending on the material forming the layer (the thickness measured or determined after drying). The thickness of the complete pattern (or a distance from the substrate surface to the topmost layer, when all layers are dry) should not exceed 2 mm or may be no greater than 1 mm or 0.5 mm. The thickness may be derived from the plurality of stacked layers formed, including colored layers and recipient layers, as disclosed herein, a base film and further topcoats or top layers which may be present.

The number of layers deposited may be between 2 and 50. In some cases, the number of layers may be in the range of 5 and 20, 5 and 15 or 5 and 10 material layers. In other cases, the full capacity of a method and a system of the invention may be utilized to deposit or print 50 or more material layers, with the maximum number of layers being practically unlimited.

In some embodiments, the thickness of the 2.5D pattern is between 8 μm and 2,000 μm. In some embodiments, the thickness is between 10 and 1,500 μm, 10 and 1,400 μm, 10 and 1,300 μm, 10 and 1,200 μm, 10 and 1,100 μm, 10 and 1,000 μm, 10 and 900 μm, 10 and 800 μm, 10 and 700 μm, 10 and 600 μm, 10 and 500 μm, 10 and 400 μm, 10 and 300 μm, 10 and 200 μm, 10 and 100 μm, 10 and 90 μm, 10 and 80 μm, 10 and 70 μm, 10 and 160 μm, 100 and 1500 μm, 200 and 1,500 μm, 300 and 1,500 μm, 400 and 1,500 μm, 500 and 1,500 μm, 600 and 1,500 μm, 700 and 1,500 μm, 800 and 1,500 μm, 900 and 1,500 μm, 1,000 and 1,500 μm, or between 100 and 1,000 μm. In some embodiments, the thickness of the pattern is no greater than 1,000 μm.

In some embodiments, the thickness of the pattern is between 100 and 500 μm, or between 100 and 400 μm, or between 100 and 300 μm.

In some embodiments, the thickness is that of a pattern of layers having between 2 and 30 layers, or between 2 and 25 layers, 2 and 20 layers, 2 and 15 layers, 2 and 10 layers, 2 and 5 layers, 5 and 30 layers, 5 and 25 layers, 5 and 20 layers, 5 and 15 layers, 5 and 10 layers, 10 and 30 layers, 10 and 25 layers, or between 10 and 20 layers.

In some embodiments, the thickness is that of a pattern of layers having between 2 and 30 layers, or 5 and 15 layers or 5 and 10 layers, wherein the thickness after drying of each layer is between 1 and 35 μm.

In some embodiments, the 2.5D pattern/image comprises a plurality of layers, which may be same or different, wherein a few of the layers of said plurality of layers having a dry thickness that is between 1 micron and 35 microns, and a number of other layers having a thickness between 0.2 nm and 35 microns. In some embodiments, the number of layers of different thicknesses may be the same or different. In some embodiments, layers of the same layer profile, as disclosed herein have same or similar thicknesses.

Also provided is a digital inkjet printing process for forming a textured pattern/image on a surface region of a substrate, the process comprising depositing by inkjet printing a water-based ink formulation on a recipient surface region of a substrate to form a layered pattern comprising a plurality (two or more) of material layers structured to adopt a preselected design; wherein the water-based ink formulation optionally containing a pigment.

In a process of the invention, the textured pattern or image is formed layer by layer, by inkjet printing or depositing one or more water-based inks to form a plurality of material layers. Each of the layers has a predefined profile (layer profile, including a design, thickness, size, position or special orientation and composition) and is selected to impart a final textured pattern. The number of layers and their profiles, i.e., their shapes, their compositions, their sizes and/or their orientation with respect to any other layer in the pattern, may vary and are unlimited in any way. The number of layers and their profiles, each independently, or in combination, may be selected to yield a predesigned texture or a final design or image with a preselected texture that is durable, and which is thick enough to provide a textured visual effect.

Typically, each layer is deposited on a previously deposited layer or directly on a substrate. The layering sequence may involve a 'wet-on-dry' deposition, whereby a layer is formed on a previous layer that has been dried, e.g., thermally dried, or may involve a 'wet-on-wet' deposition, whereby a layer is formed on a previous layer that has not been dried or has not been completely dried so that it remains partially wet. The selection of a proper deposition sequence may depend, inter alia, on the ink used, its composition and conditions of deposition, as known to a person versed in the art, including for example on whether the deposition process is carried out in-line or in sequence or whether some of the initial layer depositions are carried out in advance.

As will be further elaborated below, deposition methods of the invention may involve sequential deposition of two (and sometimes more than two) different types of ink formulations. Typically, the two groups used are: a first group includes inks that are clear or white or colorless or pigment-free or dye-free recipient ink formulation. This first group of inks is referred to herein as "recipient inks" or recipient ink formulations. The second group of inks are "color inks" (or color ink formulations) and includes inks that are pigment- or dye-containing ink formulations. It should be noted that a pigment or a dye used in the color inks may be of any color, including white. As such, the distinction between the two groups of inks resides mainly in the functionality and composition of the inks.

According to a non-limiting printing sequence, each color ink formulation is deposited on a recipient layer (namely a layer formed of a recipient ink) that has been optionally dried prior to deposition of the color ink. Such a sequence allows for a better fixation of the color ink formulation onto the surface. For example, a recipient ink formulation (A) may be deposited directly onto a surface region of a substrate, as defined herein. A color ink formulation (B) may be subsequently deposited. A subsequent deposition of a recipient ink formulation on the colored layer formed (resulting from deposition of the colored ink formulation), may allow for structuring a pattern having a visual of choice. Repeated deposition of different or same formulations may result in a stack of layers A, B, A, B, etc. whereby each layer A and B may be of the same or different profile (i.e., design, thickness, size, position or special orientation and composition).

Textured patterns formed according to aspects of the invention are layered patterns generally comprising three main layered or stacked components, wherein each of the three components may be structured or formed of one or two or more material layers. The three main components are:

a substrate with at least one surface region that is receptive of an ink formulation and which optionally has a base layer as a recipient layer, a layered structure that is optionally colored and is formed of multiple material layers, and optionally a blanket, optionally colored, comprising one or more material layers, one of which constituting a topcoat, wherein the three components are stacked one on top of the other. Where a base layer is present, it is a material layer mediating or bridging the at least one surface region and the layered structure.

As used herein, the term "layer" refers to a thin film or a thin coat formed by deposition of a recipient ink or a color ink, by inkjet, or by any other deposition method, on a surface region of a substrate or on a face region of an underlying layer of same or different profile. Multiple layers of the same material may be stacked one on top of the other to produce a layer of a greater thickness. Each color layer, as defined herein, is deposited by inkjet printing, may be 1 to 35 μm-thick, when measured after drying. Each recipient layer, as defined herein, may be 0.2 nm to 35 microns thick, when dry. The overall thickness of the textured or pattern is about 1 mm.

Each of the material layers may be formed from an ink formulation that is same or different to another ink formulation used for forming another of the layers of the textured pattern. In some embodiments, each of the layers is formed of a different ink formulation. In other embodiments, each of the layers is formed of the same ink formulation. Alternatively, different ink formulations may be used to form different regions or sections or layers of a final textured pattern or 2.5D image. In other words, two or more formulations may be used to form a single layer, whereby different regions of the layer are formed of different formulations.

Similarly, different inks may be used to endow a different visuality or a texture to different regions of the textured image. For example, one ink may be used to endow a certain region with a matt visuality while a glossy ink may be used in other regions of the pattern.

The term "ink formulation" or "formulation" generally encompasses any water-based formulation or ink used for deposition by inkjet. Ink formulations used according to the invention are utilized in a preselected deposition sequence to construct a textured pattern. Thus, ink formulations of the invention may be any white, color or functional water-based inks known in the art. The ink formulation may be a white ink, a dye-based ink, a pigment-based ink, a thermally activated ink, a functional ink and others. The ink formulation may be specifically tailored for a specific class or selection of base formulations by including functional additives that impart mechanical, chemical, structural visual, textural or any other property to the layer(s) formed therefrom.

As noted herein, a "recipient ink formulation" is a pigment- or a dye-free ink or a clear formulation (forming a clear or a transparent layer) that typically comprises no pigment or a dye. The recipient ink formulation may be used to form a receptive layer on a surface region of a substrate and/or on a layer formed of a different ink formulation (such as a colored ink formulation), wherein deposition of the recipient ink formulation on the layer formed of the different ink formulation is intended to increase fixation of the next layer thereto. Thus, the recipient ink formulation may be used in one or more of the following:

- as a base layer formed directly on a surface region of a substrate for constructing a 2.5D pattern;
- as an intermediate recipient layer formed between any two layers of a color ink formulation(s);
- as a base layer formed on a surface region of a substrate for constructing a 2.5D pattern and as an intermediate recipient layer between any two layers of a color ink formulation(s); and
- as a base layer formed on a surface region of a substrate for constructing a 2.5D pattern and as an intermediate recipient layer in an alternating structure, wherein each color ink layer formed from a color ink formulation is separated from another same or different layer by a layer formed of a recipient ink formulation.

The "color ink formulation" is any water-based inkjet ink formulation that comprises a pigment and/or a dye, as known in the art. Typically, the color formulation comprises a CYMK (Cyan, Yellow, Magenta and black) pigment or dye or a mixture of pigments or dyes. The color formulation may also, or alternatively, comprise a white pigment. Thus, formulations providing layers of all possible colors and color combinations are possible. The color ink formulations are typically free of a fixation agent or any one or more components of the recipient formulations. For example, the color formulation is free of VAE or a derivative thereof.

The pigment used in color formulations and color layers formed therefrom may be any pigment used in water-based ink formulations suitable for inkjet printing. Such pigments may include any organic or inorganic pigment known in the art, including white, black, yellow, cyan, magenta, orange, brown, red, violet, blue, green, fluorescent, metal powder and others. Non-limiting examples include carbon black, azo pigments, phthalocyanine pigments, anthraquinone pigments, perylene and perynone pigments, polycyclic pigments, naphthol pigments, anthrapyrimidine pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, metal complex pigments, natural pigments, and inorganic pigments, among others.

Additional colored pigments that may be used in colored ink formulations used according to the invention include:

- white pigments such as titanium dioxide; and
- colored pigments known, for example, under the color index (C.I.):
  - C.I. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120,123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190,191, 192, 193, 194 and others;
  - C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264 and others;
  - C.I. Pigment Violet 1, 2, 3, 5, 13, 19, 23, 25, 27, 29, 31, 32, 37, 39, 42, 44, 50 and others;
  - C.I. Pigment Blue 1, 2, 3, 9, 10, 14, 15, 16, 18, 19, 21, 22, 24, 25, 56, 60, 61, 62, 63, 64, 65, 66, and others;
  - C.I. Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, 69 and others;
  - C.I. Pigment Green 1, 2, 4, 7, 8, 10, 34, 36, 45, 47, and others;
  - C.I. Pigment Brown 1, 2, 3, 5, 22, 23, 25, 26, 32, 38, 41, 42 and others;
  - C.I. Pigment Black 1, 7, 20, 31, 32 and others.

As used herein with respect to any one formulation used according to the invention, the singular form "formulation" or "ink" encompasses also a combination of two or more formulations or inks, deposited sequentially, together or in any sequence.

The recipient or color ink formulations used as herein may comprise a water-based carrier and optionally also a functional additive. Such additive may be rheology modifiers, defoamers, softeners, latent acids, latent bases, preservatives, biocides, wetting agents/surfactants, activating agents, polymerizing or crosslinking agents, alkali soluble agents, penetrating agents, wax materials, pH-adjusting agents, isocyanates or block isocyanates, carbodiimides, polycarbodiimide, epoxy crosslinking agent, organic or inorganic acids and bases, polyvinyl alcohol (PVOH), ethylene-vinyl acetate (EVA), polyvinyl acetate (PVAc), ethylene-vinyl alcohol (EVOH), cellulose and derivatives thereof (including methyl celluloses, hydroxy ethyl cellulose and others), polyurethane, acrylate, styrene-acrylic copolymer, and dispersions or emulsions thereof. The ink formulation may further or alternatively include resins and polymeric materials and dispersions and emulsions thereof.

The functional additive may be silica, clay, resins, micro or nanoparticles, and others, as further elaborated hereinbelow.

Irrespective of the type of ink used, the layered pattern comprising a plurality of material layers and structured to adopt a preselected design is formed by repeated deposition or layering of one or more ink formulations, one on top of the other, in a stacked form. Stacking of the layers, however, need not result in a co-aligned stacking of material layers nor follow a contour of any one previous layer. The programmed layer deposition or stacking of layers of different sizes, shapes and/or compositions results in the formation of the patterned design. In some cases, each of the layers, each being optionally made of the same or different composition, is formed to have a different layer profile, as defined, and/or is formed to have a different thickness and/or is deposited in different locations on a surface region with respect to a previously deposited layer. Thus, the design may include any sequence or order of shapes that is unique or which is repeated two or more times, or that is randomly formed. The shapes can be simple shapes like circles or squares, or other objects such as arrows, flowers, moons, and stars, wood, or any other simple or complex shape or design.

A major challenge in forming a printed 2.5D design on a surface region of a substrate is ink-surface compatibility. To maximize compatibility between a water-based ink formulation used in forming the textured pattern and a surface region, so as to achieve high quality patterns or images, the surface region may be pre-treated and/or coated with a mediating or recipient film or layer.

Substrate surfaces, such as those used for wallpapers, tabletops and others are polymeric surfaces typically of low surface energy, rendering them less or not receptive to water-based formulations. In such cases, ink wetting and adhering to the substrate may be poor. Several options are available for raising the surface energy of a surface. These include, for example, physical treatment of the surface (using e.g., corona, plasma, and/or thermal treatment), and chemical treatment of the surface. Physical and chemical surface treatments may be used separately or in combination.

Thermal treatment may involve heating the substrate from below or from above, by conventional heating means, IR lamps mounted on a print carriage, by air or hot air ventilation, causing removal of water and other volatiles or vapors, or by any other means which drive an increase in surface energy and as a consequence a better surface wetting. Similarly, chemical modification of the surface may allow for ink absorption and/or chemical interaction between the ink and the chemically modified surface, allowing for ink fixation.

In some embodiments, a process of the invention comprises pretreating a surface region of a substrate to render said surface region receptive and/or chemically reactive towards a water-based colored ink deposited to form a layered pattern or image. The expression "rendering a region receptive and/or chemically reactive" encompasses any of the optional treatments, e.g., physical and/or chemical, for causing the surface sufficiently active to securely associate to a color ink layer formed thereon. Putting it differently, the expression encompasses treating the region to render the surface a recipient surface, capable of secure fixation of a component of the color ink to the surface region.

In some embodiments, the rendering of the surface region receptive and/or chemically reactive to a water-based color ink comprises one or more of:

(a) physical treatment of the surface region, said physical treatment comprises thermally treating the surface region and/or treating the surface region by corona or plasma; and (b) chemical treatment of the surface region, said chemical treatment comprising forming on the surface region a film or a layer of a recipient and/or chemically reactive material, as disclosed herein. The amount of recipient material to be deposited should be kept to a bare minimum and may depend on the type of recipient formulation used and the means by which the formulation is applied or deposited. The thickness of such a material layer, when dry, may be sub-nanometric, e.g., as low as 0.2 nm, to several microns, e.g., 35 microns. Typically, such a recipient layer is uniquely thin and may be sub-nanometric to nanometric in thickness (thickness determined when dry).

In some embodiments, the recipient surface region is a surface region of the substrate capable of associating with at least one ink component. In some embodiments, the recipient surface region is a thermally treated surface region of the substrate, or a corona treated surface region, or a plasma treated surface region. In some embodiments, the recipient surface region is a surface region of the substrate having a recipient material layer formed thereon.

In some configurations of the invention, a process comprises forming a receptive and/or chemically reactive layer on the surface region to enable durable association between the textured image and the surface region. The nature of the receptive and/or chemically reactive layer may be tailored to modulate surface association, pattern quality, fixation, visual variation, etc. Thus, in some embodiments a process of the invention comprises forming a receptive layer of at least one receptive material on a surface region of a substrate and forming by inkjet printing the optionally colored layered pattern thereon.

The recipient ink formulation used to form a recipient layer on a surface of the substrate as well as optionally a recipient layer provided between any two subsequent material layers may be any pretreatment formulation used in printing on a polymeric, metallic, paper or fabric surface.

In some embodiments, the recipient formulation is an aqueous or a water-based formulation comprising an ink fixation agent. The aqueous formulation may further comprise, in addition to water as a carrier and the ink fixation agent at least one additive such as rheology modifiers, defoamers, softeners, latent acids, latent bases, preservatives, biocides, and wetting agents/surfactants. The recipient formulation may additionally include activating agents, polymerizing or crosslinking agents, alkali soluble agents, penetrating agents, wax materials, pH-adjusting agents, isocyanates or block isocyanates, carbodiimides, polycarbodiimide, epoxy crosslinking agent, organic or inorganic acids and bases. The formulation may further include resins and polymeric materials and dispersions and/or emulsions thereof.

In some embodiments, the rheology modifier may be selected amongst inorganic and organic materials such as clays, fumed silica, cellulosic materials, and others. Non-limiting examples include Byk RHEOBYK H 370 VF, Byk LP R 21675, Lubrizol Solthix™ T21810, BASF RHEOVIS® AS 1337, BASF RHEOVIS® HS 1332, BASF RHEOVIS® PU 1191, BASF RHEOVIS® PU 1250 NC, BASF Rheovis® PU 1291, BASF RHEOVIS® PE 1331.

In some embodiments, the polymer materials are polyvinylpyrrolidone (PVP), polyacrylates, polyvinyl alcohol (PVOH), ethylene-vinyl acetate (EVA), polyvinyl acetate (PVAc), ethylene-vinyl alcohol (EVOH), cellulose and derivatives thereof (including methyl celluloses, hydroxy ethyl cellulose and others), vinyl acetate/ethylene copolymer (VAE) or a derivative thereof.

In some embodiments, the polymeric material is not EVA and the recipient formulation is free of EVA.

In some embodiments, the polymeric material is VAE or a derivative thereof.

The latent acid or base may be selected amongst such compounds that decompose upon exposure to heat or upon exposure to a suitable reaction condition, e.g., hydrolysis, or to a material (e.g., in the ink formulation) to provide an acid or a base. In some embodiments, the latent acids or bases are selected amongst such materials having thermal activation (to form the acid or base) that is between 60° C. and 115° C. The acid or base generated at an elevated temperatures as above may catalyze a self-crosslinking reaction between various polymers present in the formulation, e.g., VAE derivative polymers in a VAE formulation, accelerating a reaction between reactive chemical moieties covalently bonded to the polymer, e.g., VAE derivative polymer backbone, as further described hereinbelow.

The acid or base generated at an elevated temperature as above, may also and/or alternatively react with the polymeric materials (resins, dispersions or emulsions) in the inks, promoting ink fixation upon contact of the ink with the recipient layer.

Exemplary latent acids include, but are not limited to, esters, sulfonic acid esters, fluorinated sulfonic acid esters, phosphonic acid esters and nitriles. The latent base may be selected amongst metal oxides which yield an alkaline material under suitable reaction conditions. Such latent bases may be selected from oxides of alkali or alkaline earth-metals such as barium oxide, calcium oxide, lithium oxide, or magnesium oxide.

In some embodiments, and depending on the substrate on which the textured pattern is formed, the aqueous formulation used for making a base layer may further comprise at least one softener which may be selected amongst commercially available polysiloxanes such as Rudolf group (RUCOFIN MISP EXTRA, RUCOFIN GWE, RUCOFIN HPU, RUCOFIN X-GWA NEW, RUCOFIN SIQ NEW), WACKER (i.e., POWERSOFT UP® 68, POWERSOFT® AE 61, POWERSOFT® CF 20), Momentive (Magnasoft 68) and others.

The at least one defoamer may be selected amongst commercially available defoamers such as Borchers (Borchers® AF 1171, Borchi® Burst DFS 600, Borchi® Burst DFS 500), Evonik (AIRASE® 4500, AIRASER 4655, AIRASE® 5355, TEGO® Foamex 832, TEGO® Foamex 833, Tego Foamex 852, TEGO® Foamex 8850), BASF (FoamStar® ED 2522, FoamStar® NO 2306, FoamStar® SI 2213) and others.

Typically, the carrier of the water-based formulations is water or a medium containing water. In some embodiments, the carrier may comprise an organic solvent, optionally a water miscible organic solvent. In some embodiments, the organic solvent may be selected amongst methanol, ethanol, propanol, iso-propanol, acetone, methyl ethyl ketone, methyl isobutyl ketone, pentane, hexane, heptane, methyl acetate, ethyl acetate, propyl acetate, derivatives thereof, and combinations thereof; I-methoxy-2-propanol, 2-methoxy ethanol, 2-ethoxy ethanol, 1-methoxy-2-acetoxy propane, derivatives thereof, and combinations thereof; tripropylene glycol monomethyl ether, tripropylene glycol-n-butyl ether, propylene glycol phenyl ether, propylene glycol, ethylene glycol, glycerol, derivatives thereof, and combinations thereof.

In some embodiments, the process is a digital inkjet printing process for forming a textured pattern or image on a surface region of a substrate, wherein the process comprises:

- treating the surface region of the substrate to render the region receptive of an ink formulation, said treating comprises (i) thermally treating the region and/or treating the region with corona and/or plasma, and/or (ii) forming a recipient layer on said region, wherein said recipient layer comprises at least one ink fixating agent;
- layer-by-layer depositing by inkjet printing a water-based color ink, to form a layered pattern comprising a plurality of material layers structured to adopt a preselected design or image (or visuality); and optionally
- color patterning at least a part of said design or image with a water-based ink formulation or formulations.

In some embodiments, the process comprises:

- forming a recipient layer on said region, wherein said recipient layer comprises at least one ink fixating agent;
- depositing a color ink formulation(s) on a region of said recipient layer, being optionally dry, to form a first colored material layer on said recipient layer; and
- depositing a recipient formulation on said first colored material layer and repeating the deposition sequence one or more time to form a layered pattern comprising a plurality of material layers and a plurality of intermediating recipient material layers, the layered pattern structured to adopt a preselected design or image; and optionally
- color patterning at least a part of said design with a water-based color ink formulation(s).

Recipient formulations comprise at least one ink fixation agent that may be any such material that upon contact with a component present in the colored ink formulation is capable of instantaneously increasing the color ink viscosity, limiting or diminishing ink bleeding. Such materials may be or may comprise a cationic material, or a polymer which may or may not be a charged polymer (e.g., positively charged).

In some cases, the ink fixation agent is a cationic material, which may be provided in a form of a salt of a metal or a salt of an organic material or a salt of a polymeric material. Examples of ink fixation agents include metal salts, salts of amines such as diamines, triamines and quaternary ammonium salts, sulfonium salts and phosphonium salts.

In some embodiments, the ammonium salt may be selected from a polyethyleneimine salt, a polyvinyl amine salt, a polyallyl amine salt, a polydimethyl aminoethyl methacrylate quaternary salt, a polydiallyl dimethyl ammonium salt, a diallylamine acrylic amide copolymer salt, and a quaternary ammonium salt of polystyrene.

In some embodiments, the ink fixation agent is an ammonium salt, such as a polyquaternary ammonium salt. Non-limiting examples include polidronium chloride, poly[bis(2-chloroethyl) ether-alt-1,3-bis[3-(dimethylamino)propyl] urea] quaternized, poly(diallyldimethylammonium chloride), poly(acrylamide-co-diallyldimethyl ammonium chloride) and nonanediamide N,N'-bis(3-(dimethylamino) propyl)-polymer with 1, l'-oxybis(2-chloroethane).

In some embodiments, the ink fixation agent is polydiallyl dimethyl ammonium salt such as poly(diallyldimethylammonium chloride).

In some embodiments, the ink fixation agent is a sulfonium salt such as poly(4-vinylbenzyltetrahydrothiophenium tetrafluoroborate) and poly(β-hydroxy sulfonium tetrafluoroborate).

In some embodiments, the ink fixation agent is a phosphonium salt, such as poly[tributyl(4-vinylbenzyl)phosphonium salt] and poly(glyceryl methacrylate bis-tributylphosphonium chloride).

In some embodiments, the ink fixation agent is provided as a cationic copolymer or cationic homopolymer.

In some embodiments, the ink fixation agent is a mixture of two or more different ink fixation agents, one of which being optionally a metal salt.

In some embodiments, the ink fixation agent is a metal salt or comprising a metal salt. A metal salt is any cationic form of a metal when provided with at least one organic or inorganic anion. The at least one metal salt may be provided as a single salt or as a combination of two or more salts. The selection of salts used, and whether the salt used is provided as a single component or as a combination of salts (namely one or more salts) may depend on a variety of factors, including, inter alia, its solubility in water or in a medium containing water and a co-solvent and its ability to form a recipient layer; thus, contributing to ink fixation onto the substrate.

The at least one metal salt may be selected from monovalent metal salts, divalent metal salts, trivalent metal salts and combinations thereof. The metal may be sodium, calcium, aluminum, copper, zinc, cobalt, nickel, magnesium, and others. The anion used as the counter ion may be an inorganic anion or an organic anion. In some embodiments, the metal salt is at least one inorganic salt and thus the anion component of the metal salt is an inorganic anion which may optionally be a chloride, a fluoride, a bromide, an iodide, a nitride, a sulfate, or phosphate anion.

Examples of suitable metal salts of monovalent cations (and counter inorganic or organic anions) include, but are not limited to, lithium chloride, lithium acetate, lithium carbonate, lithium nitrate, lithium phosphate, sodium chloride, sodium acetate, sodium carbonate, sodium nitrate, sodium phosphate, potassium acetate, potassium chloride, potassium carbonate, potassium phosphate, potassium nitrate, copper nitride, copper sulfate, silver chloride, silver nitride, silver sulfate, silver acetate, silver citrate, silver propionate, silver phosphate, gold chloride, gold nitride, gold sulfate, gold acetate, gold citrate, gold propionate, and gold phosphate.

In some embodiments, the at least one metal salt is not a monovalent metal salt.

Examples of suitable salts of divalent cations (and counter inorganic or organic anions) include, but are not limited to, magnesium chloride, magnesium acetate, magnesium carbonate, magnesium nitrate, magnesium phosphate, calcium chloride, calcium acetate, calcium carbonate, calcium nitrate, calcium nitrate, calcium phosphate, zinc chloride, zinc acetate, zinc carbonate, zinc nitrate, zinc phosphate, copper chloride, copper acetate, copper carbonate, copper nitrate, copper phosphate, tin chloride, tin acetate, tin carbonate, tin nitrate, tin phosphate, ferrous chloride, ferrous acetate, ferrous carbonate, ferrous nitrate, ferrous phosphate, and combinations thereof.

In some embodiments, the salt is a calcium salt. Non-limiting examples of calcium salts include $CaCl_2$), $CaF_2$, $CaBr_2$, $CaI_2$, calcium carbonate, calcium acetate ($CaAc_2$) and mixed halide salts such as CaIBr, CaClBr and others. In some embodiments, the salt is $CaCl_2$). In some embodiments, the salt is calcium acetate.

Unlike layers of the layered structure that are formed by digital printing, e.g., inkjet printing, the recipient layer formed directly on a surface region of a substrate may be formed by any deposition or application method, including for example brushing, spraying, printing, digital inkjet printing etc. Thus, pretreatment of the surface region may comprise forming the recipient layer by brushing, spraying or by any method of printing or digital inkjet printing. Any recipient layer formed between layers of an ink formulation may be similarly formed or may be exclusively formed by inkjet printing. Within the context of the invention, non-inkjet deposition methods are those that do not utilize inkjet printing for forming a material layer. The non-inkjet methods may include brushing, spraying, dipping, washing and others disclosed herein or known in the art.

In some embodiments, the process is a digital inkjet printing process for forming a textured pattern or image on a surface region of a substrate, wherein the process comprises:

forming a recipient layer on said region, wherein said recipient layer comprises at least one ink fixating agent selected from cationic materials as disclosed herein;

layer-by-layer depositing by inkjet printing a water-based color ink, to form a layered pattern comprising a plurality of material layers structured to adopt a preselected design; and optionally color patterning at least a part of said design with a water-based ink formulation(s).

In some embodiments, the process is a digital inkjet printing process for forming a textured pattern or image on a surface region of a substrate, wherein the process comprises:

depositing a recipient formulation for forming a recipient layer on said surface region, wherein said recipient layer comprises at least one ink fixating agent selected from cationic materials as disclosed herein;

depositing by inkjet printing alternate layers of a recipient ink formulation and a colored ink formulation(s), to form a layered pattern comprising a plurality of material layers, wherein the recipient ink formulation having a composition same or different to that used for forming the recipient layer in the surface region.

In some embodiments, the recipient formulation used for forming a base or recipient layer on a surface region of the substrate and/or for forming intermediating layers between any two layers formed of a colored ink formulation(s) may comprise at least one polymer or a copolymer. The polymer or copolymer may be provided in combination with an ink fixation agent as disclosed and selected herein.

In some embodiments, the copolymer is vinyl acetate/ethylene copolymer (VAE) and/or a derivative thereof.

In some embodiments, the recipient formulation may comprise at least one ink fixation agent and a VAE-based material (being VAE and/or a VAE derivative).

Thus, according to some embodiments of the invention, a process of the invention may comprise forming a VAE-based material layer on a surface or a surface region of a substrate and forming on the layer of the VAE-based material, by inkjet printing, a layered pattern comprising a plurality of water-based material layers and structured to adopt a preselected design; and optionally color patterning at least a part of said design with a water-based ink formulation(s).

In some embodiments, the process thus comprises:

treating the surface region of the substrate to render the region recipient of an ink formulation, wherein said treating comprises (i) thermally treating the region and/or treating the region with corona and/or plasma, and/or (ii) forming a recipient layer of a VAE-based material on said region, wherein said recipient material layer comprises at least one ink fixating agent;

layer-by-layer depositing by inkjet printing a water-based ink, to form a layered pattern comprising a plurality of material layers structured to adopt a preselected design; and optionally color patterning at least a part of said design with a water-based ink formulation(s).

In some embodiments, the process comprises:

forming a recipient layer of a VAE-based material on said region, wherein said recipient material layer comprises at least one ink fixating agent;

depositing an ink formulation(s) on a region of said layer of a VAE-based material, being optionally dry, to form a first ink material layer on said VAE layer; and depositing a formulation comprising a VAE-based material on said first ink material layer and repeating the deposition sequence one or more time to form a layered pattern comprising a plurality of material layers and a plurality of intermediating layers of a VAE-based material, the layered pattern is structured to adopt a preselected design; and optionally color patterning at least a part of said design with a water-based ink formulation(s).

In other words, processes of the invention allow for alternate deposition of a recipient formulation (e.g., a formulation comprising at least one ink fixation agent and optionally a VAE-based material), and a colored ink formulation (being typically free of VAE-based material), such that an alternating stack of layers is formed on the surface region. In some cases, in such an alternating process, the recipient formulation used to form a base layer on the surface region is the same as the recipient layers formed between any two ink layers. In some other cases, the formulations may be different.

In some embodiments, the formulation of the VAE-based material consists at least one ink fixation agent, at least one vinyl acetate/ethylene copolymer (VAE) and/or a derivative thereof and a water-based carrier. The formulation may comprise at least one additive, as defined.

In some embodiments, the formulation consists at least one ink fixation agent, at least one vinyl acetate/ethylene copolymer (VAE) and/or a derivative thereof, a carrier and at least one additive selected from a defoamer, a latent acid and a latent base.

In some embodiments, the ink fixation agent is a salt, wherein optionally the metal salt is selected from calcium salts, such as calcium acetate, $CaCl_2$, $CaF_2$, $CaBr_2$, $CaAc_2$, or $CaI_2$.

In some embodiments, the ink fixation agent is an ammonium salt selected from a polyethyleneimine salt, a polyvinyl amine salt, a polyallyl amine salt, a polydimethyl aminoethyl methacrylate quaternary salt, a polydiallyl dimethyl ammonium salt, a diallylamine acrylic amide copolymer salt, and a quaternary ammonium salt of polystyrene.

In some embodiments, the ink fixation agent is a polyquaternary ammonium salt, optionally selected from polidronium chloride, poly[bis(2-chloroethyl) ether-alt-1,3-bis[3-(dimethylamino)propyl]urea] quaternized, poly(diallyldimethylammonium chloride), poly(acrylamide-co-diallyldimethylammonium chloride) and nonanediamide N,N'-bis(3-(dimethylamino)propyl)-polymer with 1,1'-oxybis(2-chloroethane).

In some embodiments, the ink fixation agent is a polydiallyl dimethyl ammonium salt. In some embodiments, the salt is poly(diallyldimethylammonium chloride).

The at least one vinyl acetate/ethylene copolymer (VAE) or a derivative thereof may be provided as a single material or as a mixture of two or more materials, as an aqueous dispersion, as a powder, as an emulsion or in any other form. In some cases, it may be provided pre-dispersed in an aqueous medium. In other cases, it may be provided as an emulsion.

The VAE-based material, being VAE and/or a derivative thereof, may be provided in combination with at least one surfactant. In some embodiments, the VAE-based material is VAE and a formulation comprising a VAE-based material comprises VAE, a fixation agent, a carrier and optionally additives. In some embodiments, the VAE-based material is a VAE derivative and a formulation comprising a VAE-based material comprises a VAE derivative, a fixation agent, a carrier and optionally additives. Alternatively, the VAE-based material may be a combination of VAE and at least one VAE derivative, and a formulation comprising a VAE-based material comprises both VAE and a VAE derivative, in combination with a fixation agent, a carrier and optionally additives.

As known in the art, "vinyl acetate/ethylene copolymer (VAE)" is a non-ionic copolymerization product of vinyl acetate and ethylene, in which the vinyl acetate content may range between 60 and 95%, and the ethylene content may range between 5 and 40% of the total weight of the copolymer. As also known, VAE is not the same as ethylene vinyl acetate (EVA) copolymers, in which case the fraction of vinyl acetate and ethylene may be different from the herein defined vinyl acetate and ethylene content. Thus, EVA is not the same material and may thus be excluded from formulations of the invention.

The VAE or derivative thereof used herein may be manufactured based on the teachings provided in PCT Application No. PCT/IL2023/050578, PCT Publication No. WO2019/126913, US Patent Application No. 2012/015201, U.S. Pat. No. 4,267,090 and others, each of which being exemplary and incorporated herein by reference for teaching VAE preparation methods. Alternatively, the VAE or derivative thereof may be purchased from commercial sources, as further disclosed herein.

The VAE or a derivative thereof, alone or in combination or in a mixture with other components disclosed herein, may be used in one or more of the following:

as a base layer formed on a surface region of a substrate for constructing thereon a 2.5D pattern;

as an intermediate recipient layer formed between any two layers of an ink formulation;

as a base layer formed on a surface region of a substrate for constructing a 2.5D pattern and as an intermediate recipient layer between any two layers of an ink formulation; and as a base layer formed on a surface region of a substrate for constructing a 2.5D pattern and as an intermediate recipient layer in an alternating structure, wherein each ink layer formed from a color ink formulation is separated from another same or different layer by a layer of VAE-based material.

In some embodiments, a VAE used in accordance with the invention has a vinyl acetate fraction (w/w) that is at least 60%, or is between 60 and 95%, or between 60 and 90%, or between 60 and 85%, or between 60 and 80%, or between 60 and 75%.

In some embodiments, the fraction (w/w) of the ethylene in the VAE may be 5%, or between 5 and 40%, or between 5 and 35%, or between 5 and 30%, or between 5 and 25%, or between 5 and 20%, or between 5 and 15%.

The chemical structure of VAE is shown below. Structure (I) depicts the repeating units derived from vinyl acetate and ethylene at a ratio m/n as detailed herein, provided that the number of repeating units provides a material having ethylene in a weight/weight ratio that does not exceed 40 wt %.

(I)

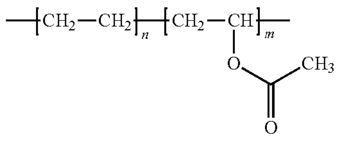

In the structure (I) shown, n, designates the relative number of repeating units derived from ethylene, and may be 5%, or between 5 and 40%, or between 5 and 35%, or between 5 and 30%, or between 5 and 25%, or between 5 and 20%, or between 5 and 15%. Integer m, designates the relative number of repeating units derived from vinyl acetate and may be 60%, or is between 60 and 95%, or between 60 and 90%, or between 60 and 85%, or between 60 and 80%, or between 60 and 75%.

In some embodiments, a ratio between m and n (m/n) is in favor of m, namely the VAE is structured of greater amount (number) of vinyl acetate units.

In some embodiments, a ratio between m and n is in favor of m, or at most 6:4 m/n.

In some embodiments, a ratio between m and n may be between 20:1 to 6:4.

In some embodiments, recipient formulations of the invention may thus comprise an ink fixation agent, VAE, any one or more non-ionic derivative thereof or combinations of same. The phrase "VAE and/or a derivative thereof" or "VAE and/or VAE derivative" encompass formulations comprising or consisting VAE; formulations comprising or consisting at least one VAE derivative; and formulations comprising or consisting VAE and at least one VAE derivative.

A "VAE derivative", as used herein, is any chemically modified (optionally non-ionic) VAE, wherein:

- a further monomer is introduced along the VAE chain, wherein said monomer is one or a plurality of monomeric recurring units, different from vinyl acetate and ethylene, and optionally comprising at least one functionality permitting crosslinking; or
- one or both of vinyl acetate and ethylene are modified, functionalized or derivatized with a functional group permitting crosslinking; or
- at least a portion (some or all) of the vinyl acetate monomers and/or at least a portion (some or all) of the ethylene monomers are chemically functionalized; or
- at least some (or all) of the vinyl acetate monomers are chemically functionalized, but none of the ethylene monomers are chemically functionalized; or
- none of the vinyl acetate monomers are chemically functionalized, but some or all of the ethylene monomers are chemically functionalized; or wherein
- the backbone of a VAE polymer formed by reacting vinyl acetate monomers with ethylene monomers is chemically functionalized.

The VAE derivative may be a modified VAE in which the chemical functionalization is selected to permit crosslinking, e.g., self-crosslinking. The derivative may be prepared by either reacting vinyl acetate monomers with ethylene monomers, where some or all of the vinyl acetate monomers and/or some or all of the ethylene monomers are chemically functionalized; or some or all of the vinyl acetate monomers are chemically functionalized but none of the ethylene monomers are chemically functionalized; or none of the vinyl acetate monomers are chemically functionalized but some or all of the ethylene monomers are chemically functionalized; or wherein the backbone of a VAE polymer formed by reacting vinyl acetate monomers with ethylene monomers is chemically functionalized.

For example, and as further detailed hereinbelow, VAE derivatives may be in a form of copolymerized vinyl acetate (VA) monomers and/or ethylene (E) monomers, wherein at least one of the VA and E monomers is N-methylol-functionalized, wherein the N-methylol is derived from N-methylol-based materials such as N-methylol-acrylamide (NMA), N-methylol methacrylamide, N-methylol maleimide, N-methylol maleinamic acid, N-methylol maleinamic acid eaters, N-methylol amides of vinyl aromatic acids such as N-methylol p-vinylbenzamide, and others.

In some embodiments, the VAE derivative is of structure (II), wherein at least one of variants R1 through R14 is a functional group selected from alcohols, amines, vinyl groups, carboxyl groups, silanols, and others, and wherein each of n1, n2, m1 and m2, independently of the other is an integer being at least 1.

In some embodiments, in structure (II), one or at least one (but—in some embodiments—not all) of variants R1 through R14 is selected as above and all other variants R1 through R14 are H.

In some embodiments, at least one variant R1 through R14 is derived from N-(hydroxymethyl) formamide (e.g., an N-(hydroxymethyl) carbamoyl group).

In some embodiments, n1 and n2 constitute together integer n as defined above. In some embodiments, m1 and m2 constitute together integer m as defined above. The ratio (m1+m2) and (n1+n2) may be determined based on the molecular weight of the functionalities making up a compound of formula (II). In some cases, the ratio may be selected based on the ratio used for VAE above. In other cases, the ratio may exceed or fall outside of the ratio defined above for m/n. For the sake of brevity, however, a ratio between (m1+m2) and (n1+n2) may be regarded as a ratio m/n, and may be selected to be between 50:1 to 1:50.

The invention further provides a recipient formulation comprising at least one ink fixation agent and at least one compound of formula (II):

(II)

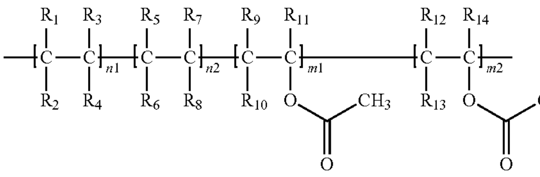

wherein at least one of variants R1 through R14 is a functional group selected from alcohols, amines, vinyl groups, carboxyl groups, silanols, and others, and wherein each of n1, n2, m1 and m2, independently of the other is an integer being at least 1.

In some embodiments, in a compound of structure (II), one or at least one (but—in some embodiments—not all) of variants R1 through R14 is selected as above and all other variants R1 through R14 are H.

In some embodiments, at least one variant R1 through R14 is derived from N-(hydroxymethyl) formamide (e.g., an N-(hydroxymethyl) carbamoyl group).

In some embodiments, n1 and n2 constitute together integer n as defined above. In some embodiments, m1 and m2 constitute together integer m as defined above. Thus, a ratio between (m1+m2) and (n1+n2) is as defined hereinabove for m/n.

The VAE derivative may be a self-crosslinkable polymer, wherein functionalization introduces reactive moieties that can react with each other to self-crosslink the VAE derivative.

As used herein, the term "self-crosslinkable" in reference to a VAE derivative material, as defined, may be a VAE material functionalized with reactive chemical moieties or groups or functionalities or monomers structured to undergo self-crosslinking, namely, to attach or associate or to form bonds with other VAE derivative polymers in the formulation. While internal linking (bonding) between different functional groups on the same VAE derivative polymer is possible, the inter-molecular self-crosslinking of the VAE derivative polymer allows for a more robust dried/cured film or coat of the pretreatment of the invention.

The reactive moieties or functional groups may be selected from alcohols, amines, vinyl groups, carboxyl groups, silanols and others. These groups may be added to the VAE molecule during the copolymerization process yielding VAE derivative or grafted thereto.

Non-limiting examples of VAE derivatives include copolymerized vinyl acetate (VA) monomers with N-methylol-functionalized ethylene monomers derived from N-methylol-based materials such as N-methylol-acrylamide (NMA), N-methylol methacrylamide, N-methylol maleimide, N-methylol maleinamic acid, N-methylol maleinamic acid eaters, N-methylol amides of vinyl aromatic acids such as N-methylol p-vinylbenzamide, and others (or additionally with ethylene monomers (E), which are not functionalized).

In some embodiments, the VAE derivative is a vinyl acetate copolymerized with an ethylene functionalized with N-methylol derived from NMA.

In some embodiments, the VAE derivative is a copolymerization product of vinyl acetate, ethylene and NMA or any N-methylol derivative selected from N-methylol methacrylamide, N-methylol maleimide, N-methylol maleinamic acid, N-methylol maleinamic acid eaters, N-methylol amides of vinyl aromatic acids such as N-methylol p-vinylbenzamide.

Non-limiting examples of VAE derivatives include copolymerized ethylene (E) monomers with N-methylol-functionalized vinyl acetate (VA) monomers derived from N-methylol-based materials such as N-methylol-acrylamide (NMA), N-methylol methacrylamide, N-methylol maleimide, N-methylol maleinamic acid, N-methylol maleinamic acid caters, N-methylol amides of vinyl aromatic acids such as N-methylol p-vinylbenzamide, and others (or additionally with vinyl acetate monomers (VA), which are not functionalized).

In some embodiments, the VAE derivative is an ethylene copolymerized with a vinyl acetate functionalized with N-methylol derived from NMA (or additionally with vinyl acetate monomers, which are not functionalized).

Thus, in some embodiments, a recipient formulation according to the invention may comprise a VAE derivative such as a copolymerization product of vinyl acetate with an ethylene functionalized with N-methylol derived from NMA (or additionally with ethylene monomers (E), which are not functionalized); or a copolymerization product of ethylene with a vinyl acetate functionalized with N-methylol derived from NMA (or additionally with vinyl acetate monomers (VA), which are not functionalized).

As used herein, the term "copolymerization product" encompasses a copolymer of the two or more components that are precursors to the copolymerization reaction. For example, the expression "copolymerization product of vinyl acetate with an ethylene functionalized with N-methylol derived from NMA" encompasses any product that is a copolymer of vinyl acetate and ethylene monomers that are functionalized with an N-methylol group derived from NMA. Such copolymers may also include unfunctionalized ethylene monomers. Same applies to an expression such as "copolymerization product of ethylene with a vinyl acetate functionalized with N-methylol derived from NMA". This expression encompasses any product that is a copolymer of ethylene and vinyl acetate monomers that are functionalized with an N-methylol group derived from NMA, wherein the copolymers may also include unfunctionalized vinyl acetate monomers.

In some embodiments, the formulation comprises an aqueous copolymer dispersion of VAE or any of the VAE derivatives mentioned herein, e.g., being commercially available from a variety of sources such as Celanese under Vinamul and Mowilith series, and Wacker Chemie AG under the VINNAPAS series, or any equivalent commercially available formulation.

Recipient formulations of the invention may comprise an amount of VAE or a derivative thereof that is sufficient to achieve a robust film or coat matrix of the VAE or a derivative thereof and comprising the at least one aggregating, and therefore ink fixating agent, as defined and selected herein. In some embodiments, recipient formulations of the invention may comprise between 0.1 and 20 wt % of VAE or a derivative thereof. In some embodiments, the amount may be between 0.1 and 15 wt %, 0.1 and 10 wt %, 0.2 and 20 wt %, 0.2 and 15 wt %, 0.2 and 10 wt %, 0.3 and 20 wt %, 0.3 and 15 wt %, 0.3 and 10 wt %, 0.4 and 20 wt %, 0.4 and 15 wt %, 0.4 and 10 wt %, 0.5 and 20 wt %, 0.5 and 15 wt %, 0.5 and 10 wt %, 2 and 10 wt %, 3 and 10 wt %, 4 and 10 wt %, 5 and 10 wt %, 6 and 10 wt %, 7 and 10 wt %, 8 and 10 wt %, 2 and 15 wt %, 3 and 15 wt %, 4 and 15 wt %, 5 and 15 wt %, 6 and 15 wt %, 7 and 15 wt %, 8 and 15 wt %, 9 and 15 wt %, 5 and 20 wt %, 6 and 20 wt %, 7 and 20 wt %, 8 and 20 wt %, 9 and 20 wt %, or is 0.5, 1, 1.5, 2, 2.5, 3, 3.5, 4, 4.5, 5, 5.5, 6, 6.5, 7, 7.5, 8, 8.5, 9, 9.5 or 10 wt %.

In some embodiments, a recipient formulation may comprise a VAE derivative and calcium chloride in a ratio of 1:0.5, 2:0.5, 4.4:0.5, 8.3:0.9 or 8.3:15. In some embodiments, a formulation comprises a VAE derivative, poly (diallyldimethylammonium chloride and $CaCl_2$ at a ratio of 3.3:1.1:6 or 5:1.7:9, 1:0.5:0.5, 2:0.5:0.5.

The amount of the at least one fixation agent, e.g., metal salt, is selected to increase pigment and or binder (present in the ink) fixation to the recipient surface treated with the pretreatment formulation of the invention. Where the ink fixation agent is a metal salt, the amount of the metal salt may thus vary between 0.1 and 20 wt %. In some embodiments, the amount may be between 0.1 and 15 wt %, 0.1 and 10 wt %, 0.2 and 20 wt %, 0.2 and 15 wt %, 0.2 and 10 wt %, 0.3 and 20 wt %, 0.3 and 15 wt %, 0.3 and 10 wt %, 0.4 and 20 wt %, 0.4 and 15 wt %, 0.4 and 10 wt %, 0.5 and 20 wt %, 0.5 and 15 wt %, 0.5 and 10 wt %, 0.1 and 5 wt %, 0.2 and 5 wt %, 0.3 and 5 wt %, 0.4 and 5 wt %, 0.5 and 5 wt %, 0.6 and 5 wt %, 0.7 and 5 wt %, 0.8 and 5 wt %, 0.9 and 5 wt %, 1 and 5 wt %, 2 and 5 wt %, 3 and 5 wt %, 0.1 and 4 wt %, 0.1 and 3 wt %, 0.1 and 2 wt %, 0.2 and 4 wt %, 0.2 and 3 wt %, 0.2 and 2 wt %, 0.2 and 1 wt %, 0.3 and 4 wt %, 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, 0.5 and 2 wt %, or is 0.2, 0.5, 1, 1.5, 2, 2.5, 3, 3.5, 4, 4.5, 5, 5.5, 6, 6.5, 7, 7.5, 8, 8.5, 9, 9.5 or 10 wt %.

In some embodiments, the recipient formulation may comprise VAE or a derivative thereof in an amount between 0.1 and 20 wt % and at least one metal salt in an amount between 0.1 and 20 wt %.

In some embodiments, the recipient formulation may comprise VAE or a derivative thereof in an amount between 0.5 and 10 wt %, 1 and 10 wt %, 2 and 10 wt %, 3 and 10 wt %, 4 and 10 wt %, 5 and 10 wt %, 6 and 10 wt %, 7 and 10 wt %, 8 and 10 wt %, 2 and 15 wt %, 3 and 15 wt %, 4 and 15 wt %, 5 and 15 wt %, 6 and 15 wt %, 7 and 15 wt %, 8 and 15 wt %, 9 and 15 wt %, 5 and 20 wt %, 6 and 20 wt %, 7 and 20 wt %, 8 and 20 wt %, or 9 and 20 wt %, and at least one metal salt in an amount between 0.1 and 5 wt %, 0.2 and 5 wt %, 0.3 and 5 wt %, 0.4 and 5 wt %, 0.5 and 5 wt %, 0.6 and 5 wt %, 0.7 and 5 wt %, 0.8 and 5 wt %, 0.9 and 5 wt %, 1 and 5 wt %, 2 and 5 wt %, 3 and 5 wt %, 0.1 and 4 wt %, 0.1 and 3 wt %, 0.1 and 2 wt %, 0.2 and 4 wt %, 0.2 and 3 wt %, 0.2 and 2 wt %, 0.2 and 1 wt %, 0.3 and 4 wt %, 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, 0.5 and 2 wt %.

In some embodiments, the recipient formulation may comprise VAE or a derivative thereof in an amount between 2 and 10 wt %, and at least one metal salt in an amount between 0.1 and 5 wt %, 0.2 and 5 wt %, 0.3 and 5 wt %, 0.4 and 5 wt %, 0.5 and 5 wt %, 0.6 and 5 wt %, 0.7 and 5 wt %, 0.8 and 5 wt %, 0.9 and 5 wt %, 1 and 5 wt %, 2 and 5 wt %, 3 and 5 wt %, 0.1 and 4 wt %, 0.1 and 3 wt %, 0.1 and 2 wt %, 0.2 and 4 wt %, 0.2 and 3 wt %, 0.2 and 2 wt %, 0.2 and 1 wt %, 0.3 and 4 wt %, 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, 0.5 and 2 wt %.

In some embodiments, the recipient formulation may comprise VAE or a derivative thereof in an amount between 5 and 10 wt % and at least one metal salt in an amount between 0.1 and 5 wt %, 0.2 and 5 wt %, 0.3 and 5 wt %, 0.4 and 5 wt %, 0.5 and 5 wt %, 0.6 and 5 wt %, 0.7 and 5 wt %, 0.8 and 5 wt %, 0.9 and 5 wt %, 1 and 5 wt %, 2 and 5 wt %, 3 and 5 wt %, 0.1 and 4 wt %, 0.1 and 3 wt %, 0.1 and 2 wt %, 0.2 and 4 wt %, 0.2 and 3 wt %, 0.2 and 2 wt %, 0.2 and 1 wt %, 0.3 and 4 wt %, 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, 0.5 and 2 wt %.

In some embodiments, the recipient formulation may comprise VAE or a derivative thereof in an amount between 6 and 15 wt % and at least one metal salt in an amount between 0.1 and 5 wt %, 0.2 and 5 wt %, 0.3 and 5 wt %, 0.4 and 5 wt %, 0.5 and 5 wt %, 0.6 and 5 wt %, 0.7 and 5 wt %, 0.8 and 5 wt %, 0.9 and 5 wt %, 1 and 5 wt %, 2 and 5 wt %, 3 and 5 wt %, 0.1 and 4 wt %, 0.1 and 3 wt %, 0.1 and 2 wt %, 0.2 and 4 wt %, 0.2 and 3 wt %, 0.2 and 2 wt %, 0.2 and 1 wt %, 0.3 and 4 wt %, 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, 0.5 and 2 wt %.

In some embodiments, the recipient formulation may comprise VAE or a derivative thereof in an amount between 2 and 10 wt %, 3 and 10 wt %, 4 and 10 wt %, 5 and 10 wt %, 6 and 10 wt %, 7 and 10 wt %, 8 and 10 wt %, 2 and 15 wt %, 3 and 15 wt %, 4 and 15 wt %, S and 15 wt %, 6 and 15 wt %, 7 and 15 wt %, 8 and 15 wt %, 9 and 15 wt %, 5 and 20 wt %, 6 and 20 wt %, 7 and 20 wt %, 8 and 20 wt %, or between 9 and 20 wt %, and at least one metal salt in an amount between 0.1 and 5 wt %.

In some embodiments, the recipient formulation may comprise VAE or a derivative thereof in an amount between 2 and 10 wt %, 3 and 10 wt %, 4 and 10 wt %, 5 and 10 wt %, 6 and 10 wt %, 7 and 10 wt %, 8 and 10 wt %, 2 and 15 wt %, 3 and 15 wt %, 4 and 15 wt %, 5 and 15 wt %, 6 and 15 wt %, 7 and 15 wt %, 8 and 15 wt %, 9 and 15 wt %, 5 and 20 wt %, 6 and 20 wt %, 7 and 20 wt %, 8 and 20 wt %, or 9 and 20 wt %, and at least one metal salt in an amount between 0.3 and 3 wt %, 0.3 and 2 wt %, 0.4 and 4 wt %, 0.4 and 3 wt %, 0.4 and 2 wt %, 0.5 and 4 wt %, 0.5 and 3 wt %, or between 0.5 and 2 wt %.

In some embodiments, in a recipient formulation of the invention, the weight amount of VAE or a derivative thereof is greater than the weight amount of the at least one metal salt.

In some embodiments, in a recipient formulation of the invention, the weight amount of VAE or a derivative thereof is smaller than the weight amount of the at least one metal salt.

In some embodiments, the weight ratio between VAE or a derivative thereof and the metal salt may be between 30:1 to 1:1 (VAE or derivative: metal salt). In some embodiments, the weight ratio is any one of 20:1, 19:1, 18:1, 17:1, 16:1, 15:1, 14:1, 13:1, 12:1, 10:1, 9:1, 8:1, 7:1, 6:1, 5:1, 4:1, 3:1 2:1 or 1:1.

In some embodiments, the weight ratio is 1:0.5, 2:0.5, 6.5:0.5, 6.5:2, 7:0.6, 1:1, 9:0.3, 9:1, 8.2:1.5, or 9:2 (VAE or derivative: metal salt).

Where the ink fixation agent is different from a metal salt, the amount of the ink fixation agent may be between 0.1 and 20 wt %, 1 and 20 wt %, 1 and 15 wt %, 1 and 10 wt %, 3 and 20 wt %, 3 and 15 wt %, 3 and 10 wt %, 4 and 10 wt %, 5 and 10 wt %, 6 and 10 wt %, 7 and 10 wt %, 8 and 10 wt %, 2 and 15 wt %, 3 and 15 wt %, 4 and 15 wt %, 5 and 15 wt %, 6 and 15 wt %, 7 and 15 wt %, 8 and 15 wt %, 9 and 15 wt %, 5 and 20 wt %, 6 and 20 wt %, 7 and 20 wt %, 8 and 20 wt %, or 9 and 20 wt %.

In some embodiments, the amount of the ink fixation agent, being different from at least one metal salt, is between 0.3 and 20 wt %, 0.3 and 10 wt %, 0.4 and 20 wt %, 0.4 and 10 wt %, 0.5 and 20 wt %, 0.5 and 10 wt %, 0.5 and 5 wt %, or between 0.1 and 1 wt %.

As noted herein, the “ratio” VAE or derivative: metal salt refers to the relative amount of VAE or derivative vs metal salt in a formulation of the invention. The ratio may be expressed also in wt % values. Where a ratio of e.g., 1:1 is mentioned, it encompasses any ratio between 1±10%:1 and 1:1±10%. In other words, a ratio of 1:1 encompasses ratios between 0.9 to 1.1:0.9 to 1.1. Similarly, as yet another example, a ratio of 5:1 encompasses ratios between 5±10%: 1±10%, namely a ratio of 4.5:1.1.

In some embodiments, a recipient formulation comprises VA-E-NMA.

In some embodiments, a recipient formulation comprises VAE and/or VA-E-NMA and a calcium-based salt, such as calcium chloride.

In some embodiments, the recipient formulation comprises a VAE derivative, as defined herein, in combination with poly(diallyldimethylammonium chloride and $CaCl_2$, wherein optionally the VAE derivative: poly(diallyldimethylammonium chloride: $CaCl_2$) is between 1:0.5:0.5, 1:0.5:1, 3:1.1:6 and 4.5:1.7:9.

In some embodiments, the recipient formulation comprises a VAE derivative, as defined herein, in combination with $CaCl_2$, optionally at a ratio VAE derivative:$CaCl_2$ of 1:0.5, 2:0.5, 4:0.5, 7.5:0.9 or 7.5:15.

In some embodiments, the recipient formulation comprises a VAE derivative, as defined herein, in combination with a polyquaternary ammonium salt. In some embodiments, the ammonium salt is poly(diallyldimethylammonium chloride. In some embodiments, the ratio VAE derivative:ammonium salt is 1:0.5, 2:0.5, 1:1 4:1, 7:1 or 8:15.

The aqueous formulation used for forming a base recipient layer on a surface region, e.g., VAE formulation comprising also a fixation agent, or between any two layers formed of an ink formulation is adapted to be printed or digitally inkjet printed or applied directly on the surface to form a dry film of predefined properties, onto which an ink formulation may be printed to form the patterned image. The substrate or surface used may be a fabric, a plastic or a polymeric material or any material comprising same. More specifically, the substrate may be any substrate selected, in some embodiments, from absorptive or non-absorptive materials, natural or synthetic materials (e.g., fabrics and textiles), paper materials (e.g., paper, paperboard, wallpaper), polymeric materials (e.g., made from a polyester, a polyethylene, a polypropylene, vinyl and acrylic, PVC, polyolefin, polyurethane, leather, metal, wood, corrugated plastic signs, plasticized nylon and blends thereof) and others. In some embodiments, the substrate is a textile or a fabric substrate may be a woven or a non-woven textile material, which may or may not be formed of a natural fiber, a synthetic fiber, or a combination of the two. Non-limiting examples of textiles and fabrics include such comprised of or formed of polyester fibers, polyurethane fibers, polyethylene fibers, polyamide fibers, polyacryl fibers, polybenzimidazole fibers, Nylon, Dacron fibers, Modacryl fibers, Rayon fibers, Viscose Rayon fibers, acetate fibers, Saran fibers, Spandex fibers, Vinalon fibers, Aramid fibers, Elastane fibers, cellulose fibers, linen fibers, Flax fibers, Hemp fibers, cotton fibers, silk fibers, wool fibers and others.

The recipient formulation may be applied non-selectively on the substrate, to cover the full surface of the substrate or to cover regions larger than those intended for ink printing; or selectively, in which case the formulation may be of substantially the same shape and size of the patterned element which it is intended to receive. When applied on a previously formed ink layer, the recipient layer formed may be of a predetermined profile, as defined herein. Following surface application by any means known in the art, such as brushing, spraying, printing, digital inkjet printing via use of a pretreat machine, printer etc., thermal drying or curing may be required to solidify the formed coat and endow it with certain intended properties. Processes of the invention are free of UV curing or curing which is different from thermal curing. Thermal treatment may typically involve heating each of the formed layers or the formed pattern as a whole at temperatures below an activating temperature of a latent acid or a base (the temperature at which the latent acid or base converts into the corresponding acid or base, respectively), where present. In some embodiments, the temperature is thus no higher than 115° C.

Where the deposition follows a wet-on-dry deposition scheme, or a combined scheme wherein some of the layers are deposited wet-on-dry, drying of the layers may be achievable as disclosed herein prior to deposition of an ink formulation thereon. Where the deposition scheme is or involves wet-on-wet deposition, drying, e.g., thermal drying, may not be required.

In some embodiments, thermal treatment may be achieved by heating the surface to a required temperature, as defined herein, from below the surface, from its sides or from a direction above the surface.

As noted herein, in some embodiments of a process of the invention, the textured pattern, being a layered pattern, comprises a base recipient layer, which may be a VAE layer formed by application, by any means, of a VAE (or derivative thereof) formulation comprising also a fixation agent, as defined. The layered element formed on a cured and dry base layer is formed by a sequence of inkjet deposition steps, whereby one or more same or different aqueous ink formulations, typically white ink formulations, are deposited to form a 2.5D pattern or image. Each of the layers, independent of their structural profile, i.e., shape, size, etc. and of their composition may be deposited by inkjet printing one on top of the other, such that each subsequent layer is deposited on a previous layer that has been cured or dried. Thus, in a sequence of inkjet deposition steps, each layer is formed and dried before a subsequent layer is deposited.

Thus, in some embodiments, in a digital inkjet printing process for forming a textured pattern or image according to the invention, the process comprises forming a recipient layer, optionally by inkjet printing, on a surface region of a substrate and allowing said layer to cure or dry; by inkjet printing depositing a plurality of layers being selected from pigment-based layers and recipient layers, one on top of the other, to form a layered pattern structured to adopt a preselected design; and optionally color patterning at least a part of said design with a water-based ink formulation(s).

In some embodiments, the process comprises deposition by inkjet on a cured or dry base layer, e.g., a VAE or a derivative thereof layer, formed on a surface region of a substrate, a plurality of layers, one on top of the other, to form a stacked layered pattern structured to adopt a preselected design; and optionally color patterning at least a part of said design with a water-based ink formulation(s).

In some embodiments, the process comprises deposition by inkjet on a cured or dry base layer, e.g., a VAE layer or a layer of a VAE derivative, formed on a surface region of a substrate, a plurality of base-ink alternating layers, e.g., layers of different compositions, forms, thicknesses, shapes, etc. one on top of the other, to form a stacked layered pattern with a preselected design.

In some embodiments, the topmost layer, i.e., the topcoat is formed of an ink formulation which may be a color ink formulation(s), a white ink formulation, a functional ink formulation or a surface modifying ink formulation, e.g., selected to impart mechanical, chemical, visual, textural or any other property to the topcoat.

In some embodiments, the process comprises:

(a) forming a base layer comprising optionally a VAE-based material or derived from an aqueous solution comprising an ink fixation agent such as a salt;

(b) curing or drying said base layer, wherein curing or drying is achievable thermally (does not involve UV curing or any sort);

(c) forming by inkjet a layer of at least one ink formulation on a region of the base layer or on a region of a preformed cured or dried layer of same or different ink formulation;

(d) curing or drying said layer of at least one ink formulation, wherein optionally curing or drying is achievable thermally (does not involve any type of UV curing); and repeating steps (c)-(d) one or more times to form the layered pattern with a structure of a preselected design.

In some embodiments, each of the plurality of layers is deposited in sequence, separated by deposition of a recipient and/or chemically reactive film selected to increase association and ink fixation of each of the layers. In other words, following the deposition, by inkjet of a first layer or pattern directly onto the base layer, the first layer is coated with a film or a layer of a recipient and/or chemically reactive material. Typically, the film or layer of the recipient and/or chemically reactive material is allowed to cure or dry before the next material is deposited. As the recipient and/or chemically reactive film or layer is not intended to shape or impart a structural attribute to the pattern, it is deposited or applied only on the surface of the layer on top of which it is applied and also on the substrate.

Thus, in some embodiments, the process comprises (a) forming a base layer comprising for example a VAE-based material; or derived from an aqueous solution comprising a salt;

(b) curing or drying said base layer, wherein optionally curing or drying is achievable thermally;

(c) forming by inkjet a layer of at least one ink formulation on a region of the base layer or on a region of a preformed cured or dried layer of same or different ink formulation or on a preformed recipient and/or chemically reactive cured or dried layer;

(d) curing or drying said layer of at least one ink formulation, wherein optionally curing or drying is achievable thermally;

(e) forming a recipient and/or chemically reactive film on the surface of the cured or dried layer of the at least one ink;

(f) curing or drying said recipient and/or chemically reactive film, wherein optionally curing or drying is achievable thermally; and repeating steps (c) through (f) one or more times to form the layered pattern with a structure of a preselected design.

While textured patterns or images according to the invention may be formed layer by layer, according to embodiments disclosed herein, alternatively or additionally, with respect to all or some of the layer deposition steps (e.g., by any of the means disclosed herein, in any process sequence), the 2.5D structure may be formed by simultaneously inkjet printing a layer of at least two different ink formulations on a region of the surface or on a region of the base layer or on a region of a preformed cured or dried layer of same or different ink formulations in which one of the different ink formulations may comprise a chemically reactive material allowing for ink fixation upon contact of the different ink formulations. The ink formulation comprising the chemically reactive material may be an aqueous solution comprising an ink fixation agent such as a salt as described herein.

Irrespective of the method of deposition, the sequence of the deposition and any of the other variable parameters disclosed herein, and as noted, drying or curing is optionally achievable thermally, e.g., by utilizing any of the means disclosed herein. UV curing is excluded. Curing or drying need not provide a fully cured or fully dried layer or film. Curing or drying should increase the viscosity of the film to an extent that allows deposition of a subsequent layer without the recipient layer and the subsequent layers intermix.

Once a layered pattern is formed according to any one process of the invention, it may be colored or coated with a blanket of a coloring material, a surface modifying material or a protective material. Coloring may be achievable by application of one or more color ink formulations on one or more regions of the layered pattern. Such a coloring material may add visual and aesthetic features to the layered design. A blanket of a colored or a transparent material, e.g., a protective material, may also be applied on part of or on the complete surface.

A matt finish or a glossy finish or appearance may be imparted to parts or regions or a complete surface of the textured pattern. Matt or glossy finishes may be imparted by using a suitable ink formulation. Alternatively, matt appearance may be achievable by all or any of the following: forming surface microfeatures, e.g., by inkjet printing such features into the several upper layers and/or the topmost layer, by forming a topcoat and/or upper layers comprising, i.e., silicon dioxide (nano size or micron size) particles, or by forming the upper layer/topcoat of an ink comprising silica or polymeric materials at a nano size or micron size particles.

Matt or glossy features may be formed along the textured pattern by locally and selectively patterning the topmost layer with a film comprising i.e., particles of silicon dioxide or polymeric materials and/or by forming microfeatures in the upper layers and/or topmost layer.

In some embodiments, the silica particles may be selected amongst commercially available silica such as Evonik ACE MATT TS100, Evonik ACE MATT OK 412, Evonik ACE MATT OK 607, Evonik ACE MATT OK 390, Evonik ACE MATT HK 390, Evonik SIPERNAR 622 LS, Grace SYLOID® 244, Grace SYLOJET® A 30, Alberdingk Boley PUR MATT 310 and Alberdingk Boley PUR MATT 910. BYK AQUMAT 208, BYK AQUAMAT 272 N, SHAMROCK TexMATTE 6005.

As noted herein, in some configurations, each of the ink layers may be mediated by a layer of a base or pretreatment formulation comprising e.g., a salt and other additives. To achieve a matt effect, a layer of a white ink may be formed on a base layer of at least one salt, e.g., calcium chloride. The matt effect obtained may be modified further by employing any of the additional means disclosed herein, for example, inclusion of microstructures or silica particles, etc.

As demonstrated in Table 1 below, glossiness or matt appearance may be controlled and varied. When a solidified (dried) layer of white ink is formed on calcium chloride dried layer, the Gloss Units measured are much smaller as compared to a dried film of the same white ink type formed directly on a surface of a polymeric substrate. In other words, when formed on a base layer, matt appearance is improved and glossiness is reduced.

TABLE 1

| Glossmeter Angles | White polymeric substrate GU (Gloss Units) | Solidified (dried) white ink printed on the white polymeric substrate GU (Gloss Units) | Solidified (dried) white ink printed on calcium chloride dried layer, coated on the white polymeric substrate GU (Gloss Units) |
|---|---|---|---|
| 20 | 73.3 | 27.8 | 3.6 |
| 60 | 95.2 | 68.1 | 22.5 |
| 85 | 95.4 | 95.4 | 40.5 |

In Table 2 the combined effect of using microstructures and silica is demonstrated as compared to not using matt-forming features at all.

TABLE 2

| Glossmeter Angles | Sample 1 (2.5D printed image of wood - 10 layers of white ink were applied, where calcium chloride dried layer was applied between each of the white ink layers and 1 CMYK top layer) - GU (Gloss Units) | Sample 2A (2.5 printed image of wood - 10 layers of white ink were applied, where calcium chloride dried layer was applied between each of the white ink layers and 1 CMYK top layer) but here microstructure was incorporated into a few of the upper white layers GU (Gloss Units) | Sample 2B (2.5 printed image of wood - 10 layers of white ink were applied, where calcium chloride dried layer was applied between each of the white ink layers and 1 CMYK top layer) but here microstructure was incorporated into a few of the upper white layers, and in addition, a top coat comprising silica particles was applied GU (Gloss Units) |
|---|---|---|---|
| 20 | 2.4 | 1.5 | 0.6 |
| 60 | 17.1 | 11.8 | 4.0 |
| 85 | 21.7 | 13.9 | 3.8 |

As Table 2 demonstrates, introducing microstructures reduces the glossiness level, and when a top coat comprising silica particles is introduced, a further reduction in the gloss level is achieved.

To determine the correct gloss measurement angle, gloss is first measured at a 60° angle:

If the result is between 10-70 GU, the object in question is considered semi-gloss and the 60° measurement angle is appropriate.

If the result is greater than 70 GU, the surface is considered high gloss and should be measured with the 20° angle.

If the result is less than 10 GU, the surface is considered matte and should be measured with the 85° angle.

Gloss values (Gloss Units) are determined based as shown in Table 3.

TABLE 3

| Gloss Range | 60° Value | Measure with |
|---|---|---|
| High Gloss | >70 GU | 20° |
| Semi Gloss | 10-70 GU | 60° |
| Low Gloss/Matt | <10 GU | 85° |

A topcoat may be formed on certain regions of the textured pattern or on the complete surface of the textured pattern. In addition to or alternatively to visual or textural modifying topcoat layers, the blanket may be designed to mechanically protect the textured pattern or the surface as a whole from a mechanically or chemically induced damage. Protective coating may be formed utilizing various polymers and coating materials (abrasion resisting materials), wetting and surface additives and others. Such may include UV quenching materials, biocidic materials, abrasion resisting materials and others.

In some embodiments, the abrasion resisting materials may be selected amongst commercially available wax materials such as BYK AQUACER 513, BYK AQUACER 507, BYK AQUACER 515, BYK AQUACER 535, BYK AQUACER 532, BYK AQUACER 531, BYK AQUACER 530, BYK CERAFLOUR 1000, BYK CERAFLOUR 1001. BYK CERAFLOUR 1002, BYK CERAFLOUR 929N, BYK AQUAMAT 208, BYK NANOBYK 3620 DEURX DEUREX EO4501 W, DEURX DEUREX EO 4601 W, BASF JONCRYL Wax 35, BASF JONCRYL Wax 28, BASF JONCRYL Wax 26, BASF Hydropalat SL 3682, SHAMEROCK HydroCER AE-1040, SHAMEROCK LoANGLE 5413, SHAMEROCK HYDROCER 145, SHAMEROCK HYDROCER AE-PP40, SHAMROCK HYDROCER AE-37EC, SHAMEROCK HYDROCER AE-35FG, EVONIK Nanopol C 750 and polymeric material such as Covestro Impranil DL 1602. Covestro CS-TEXTILE 272-2 (Impranil DL 1620), Covestro NeoRez R-4000, Covestro Decovery D-2105 Alberdingk U 502 VP, Alberdingk U 3251, Alberdingk U 475, Alberdingk U 400 N, Alberdingk AC 2592, Alberdingk U 3200 VP, Alberdingk U 5201, Alberdingk AC 548, Alberdingk U199, Alberdingk U 228 VP, Alberdingk U 502 VP, Alberdingk U 4101, Alberdingk PUR MATT 910 VP, Alberdingk PUR MATT 310 VP, Alberdingk PC 4007 VP, Alberdingk PUR MATT 4700 VP, Alberdingk U 4000, Alberdingk U 4040, EASTMAN EASTEK 1100, EASTMAN EASTEK 1200, EASTMAN EASTEK 1400, BASF Joncryl DPS 3771, BASF Joncryl DPS 3775, BASF Joncryl DPS 3791, BASF Joneryl FLX 5000, BASF Joncryl FLX 5002, BASF Joncryl FLX 5010, BASF Joncryl FLX 5020, BASF Joneryl FLX 5060, Joneryl 8225, Acronal LR 9014. and combinations thereof.

In some embodiments, the wetting and surface additives may be selected amongst commercially materials such as Byk 348, Byk 333, Byk 349, Byk 3480, Byk 3760, Byk 3420, Byk 3410, Byk 3451, Evonik Tego wet 270, Evonik Tego wet 240, Evonik Tego wet 280, Evonik Surfynol 465, Evonik Dynol 604, Evonik Dynol 607, Evonik Dynol 360, BASF Hydropalat WE 3220, BASF Hydropalat WE 3650, BASF Hydropalat WE 3120, BASF Hydropalat WE 3221, BASF Hydropalat WE 3197.

As noted above, in some configurations of the invention, the technology contemplates DIY as well as industrial means for manufacturing textured covers for objects. Such objects may be any aesthetic or functional objects, including for example, surfaces, furniture, devices, vehicle wraps etc. The technology disclosed herein is particularly useful in forming wallpapers.

As is known in the art, wallpaper is a covering for surfaces, mainly walls. Wallpapers are made from long sheets of paper that have been stenciled, painted, or printed with abstract or narrative designs. While wallpapers are designed to cover walls and other decorative surface, they may also be used as floor coverings, furniture coverings as well as covering means for any object of desire.

From a structural perspective, a wallpaper is a patterned surface designed so that the pattern or textured design or image is repeated in a way that when different runs of a wallpaper are assembled according to the pattern and design, the textured design is repeated without it being easy to distinguish between one run from another. Pre-pasted vinyl coated paper wallpapers as well as cloth backed vinyl are most common substrates for forming wallpapers and may be used according to processes of the invention for filing a textured design.

The invention further provides an object or a wallpaper having a textured surface or an image formed according to processes of the invention.

An exemplary color ink formulation used for forming the textured design of the invention is provided in Table 4.

TABLE 4

| Ingredient | Amount |
|---|---|
| Humectants | 7%-50% w/w |
| DI Water | 4%-40% w/w |
| Wetting agents | 0.1%-12% w/w |
| Polyurethane resin dispersion | 16%-40% w/w |
| C/M/Y/K/W Pigment dispersion | 0.5%-20% w/w |

Other ink formulations may be used in place of that in Table 4.

Exemplary abrasion resisting formulations used for testing the durability of a topcoat (top most layer) having the composition provided in Table 5.

TABLE 5

| Ingredient | Amount |
|---|---|
| Polymer (resin/binder) | 10-40% w/w |
| DI Water | 59%-64% w/w |
| Wetting agents | 2.45%-3.23% w/w |
| Matting agent | 1%-20% w/w |
| Abrasion resisting material | 0.5%-20% w/w |

Other topcoat abrasion resisting formulations may be used in place of that in Table 5.

Abrasion resistance was tested using instrument 'Taber Rotary Platform abrasion Tester' Model 1700, using abrasion disk CS-10, each rotating platform is 1000 g total (250 g arm spindle+750 g wheel weight).

Printed samples chosen to be tested included water based pigmented ink layers (such as that in Table 4) with manual implementation of pretreatment liquid prior to each jetted ink layer on polymer film substrate, i.e., PVC designed for wallpaper applications.

Layers include total five layers: four white ink (100% solid) and the fifth (top layer) was magenta ink (100% solid). Each of the applied layers were dried utilizing hot air. Other samples included 10 layers or more.

The topcoat abrasion resisting layer (over print varnish, OPV) was applied by automatic draw down instrument, using Green Mayer rod (24-micron wet film) on top of the printed layers and dried in and oven at 100° C.

Samples were tested on Taber on the day after. The sample having no abrasion resistance topcoat (OPV) showed wear damage already after ~40 cycles, while the sample coated with an abrasion resistance topcoat (OPV) pass 7000 cycles without any wear damage.

The invention provides the following aspects and embodiments of methods for forming 2.5D images:

A digital inkjet printing process for forming a 2.5D pattern on a surface region of a substrate, the process comprising depositing by inkjet printing a water-based color ink formulation on a substrate having a recipient surface region to thereby form a layered 2.5D pattern comprising a plurality of material layers structured to adopt the 2.5D pattern with a preselected design; wherein the water-based ink formulation optionally containing a pigment, the 2.5D pattern having a thickness of not greater than 1 mm, and wherein the process does not comprise deposition of UV-based ink formulations or UV-irradiation steps.

In some configurations of a process of the invention, the thickness of the pattern is between 200 and 500 microns.

In some configurations of a process of the invention, the image comprising between 2 and 50 layers.

In some configurations of a process of the invention, the image comprising between 5 and 10 layers.

In some configurations of a process of the invention, the recipient surface region is a thermally treated surface region of the substrate, or a corona treated surface region, or a plasma treated surface region.

In some configurations of a process of the invention, wherein the recipient surface region is a surface region of the substrate having a recipient material layer formed thereon, wherein the recipient material layer comprises at least one ink fixation agent.

In some configurations of a process of the invention, the 2.5D pattern formed on the recipient surface comprises a plurality of stacked material layers separately formed from recipient ink formulations and color ink formulations deposited in sequence.

In some configurations of a process of the invention, a color ink formulation is deposited on the recipient surface to form a first colored layer, subsequently a recipient formulation is deposited on the first colored layer to form a first intermediating material layer, followed by deposition of a further color ink formulation on the first intermediating layer, wherein further color ink formulations and recipient ink formulations are deposited in sequence, wherein each of the recipient ink formulations and each of the color ink formulation having same or different composition, and wherein each of the layers having same or different layer profiles.

In some configurations of a process of the invention, the process is for forming a stacked pattern comprising alternating layers of recipient layers and color layers.

In some configurations of a process of the invention, the recipient surface is a layer formed of a recipient formulation comprising at least one ink fixation agent, and wherein each of the intermediating layers is formed of the same or different recipient formulation.

In some configurations of a process of the invention, the color ink formulation is a white ink formulation.

In some configurations of a process of the invention, each of the colored layers formed is of the same or different color or hue.

In some configurations of a process of the invention, the layer profile comprises layer design, thickness, size, position/orientation and composition.

In some configurations of a process of the invention, the process is for forming a 2.5D pattern having a design wherein not all layers forming the design are of the same profile.

In some configurations of a process of the invention, the process comprising deposition of a recipient formulation on a surface region of a substrate to form a recipient surface, wherein the recipient formulation comprises at least one ink fixation agent selected from a cationic material, and optionally a charged polymer.

In some configurations of a process of the invention, each of the recipient formulations comprises a cationic material or a polymer that is optionally a charged polymer.

In some configurations of a process of the invention, the cationic material is in a form of a salt of a metal or a salt of an organic material or a salt of a polymeric material.

In some configurations of a process of the invention, the ink fixation agent is or comprises a metal salt, an ammonium salt, a sulfonium salt or a phosphonium salt.

In some configurations of a process of the invention, the ink fixation agent is or comprises a metal salt of a metal selected from sodium, calcium, aluminum, copper, zinc, cobalt, nickel, and magnesium.

In some configurations of a process of the invention, the metal salt is a calcium salt.

In some configurations of a process of the invention, the calcium salt is $CaCl_2$, $CaF_2$, $CaBr_2$, $CaI_2$, calcium carbonate, or calcium acetate or a mixed halide salt.

In some configurations of a process of the invention, the recipient surface is a recipient layer formed on the substrate, the layer comprising a calcium salt, being optionally $CaCl_2$) or calcium acetate.

In some configurations of a process of the invention, the recipient surface is a recipient layer formed on a substrate and comprising an ink fixation agent selected from a polyethyleneimine salt, a polyvinyl amine salt, a polyallyl amine salt, a polydimethyl aminoethyl methacrylate quaternary salt, a polydiallyl dimethyl ammonium salt, a diallylamine acrylic amide copolymer salt, and a quaternary ammonium salt of polystyrene.

In some configurations of a process of the invention, the ink fixation agent is an ammonium salt or a polyquaternary ammonium salt.

In some configurations of a process of the invention, the ammonium salt is selected from polidronium chloride, poly [bis(2-chloroethyl) ether-alt-1,3-bis[3-(dimethylamino) propyl]urea] quaternized, poly(diallyldimethylammonium chloride), poly(acrylamide-co-diallyldimethyl ammonium chloride) and nonanediamide N,N'-bis(3-(dimethylamino) propyl)-polymer with 1,l'-oxybis(2-chloroethane).

In some configurations of a process of the invention, the ink fixation agent is polydiallyl dimethyl ammonium salt.

In some configurations of a process of the invention, the ink fixation agent is poly(diallyldimethylammonium chloride).

In some configurations of a process of the invention, the ink fixation agent is a sulfonium salt.

In some configurations of a process of the invention, the ink fixation agent is selected from poly(4-vinylbenzyltetrahydrothiophenium tetrafluoroborate) and poly(β-hydroxy sulfonium tetrafluoroborate).

In some configurations of a process of the invention, the ink fixation agent is a phosphonium salt.

In some configurations of a process of the invention, the ink fixation agent is selected from poly[tributyl(4-vinylbenzyl)phosphonium salt] and poly(glyceryl methacrylate bistributylphosphonium chloride).

In some configurations of a process of the invention, the recipient surface is a recipient layer comprising at least one ink fixation agent and a vinyl acetate/ethylene copolymer (VAE)-based material, wherein the VAE-based material is selected from VAE and a VAE derivative.

In some configurations of a process of the invention, the process comprising depositing by inkjet printing a water-based ink formulation on a substrate having a VAE-based recipient surface region to form a layered 2.5D pattern comprising a plurality of material layers structured to adopt the 2.5D pattern with a preselected design.

In some configurations of a process of the invention, the process comprises forming a recipient layer on a surface region of the substrate.

In some configurations of a process of the invention, the recipient surface region is thermally treated, and/or corona treated, and/or plasma treated prior to the forming of the recipient layer.

In some configurations of a process of the invention, the recipient layer comprises at least one ink fixation agent.

In some configurations of a process of the invention, the recipient layer comprises a VAE-based material.

In some configurations of a process of the invention, the 2.5D pattern is formed on a VAE-based recipient surface, and the pattern comprises a plurality of stacked material layers separately formed from VAE-based recipient ink formulations and color ink formulations deposited in sequence.

In some configurations of a process of the invention, the color ink formulation is deposited on the VAE-based layer to form a first colored layer, subsequently a VAE-based recipient formulation is deposited on the first colored layer to form a first intermediating VAE-based layer, followed by deposition of a further color ink formulation on the first VAE-based layer, wherein further color ink formulations and recipient ink formulations are deposited in sequence, each of the recipient ink formulations and each of the color ink formulation having same or different composition, and wherein each of the layers having same or different layer profiles.

In some configurations of a process of the invention, the process is for forming a stacked pattern comprising alternating VAE-based layers and colored layers.

In some configurations of a process of the invention, the process comprising:

forming a recipient layer of a VAE-based material on said surface region, wherein said recipient material layer comprises at least one ink fixating agent;

depositing a color ink formulation on a region of said layer of a VAE-based material, being optionally dry, to form a first ink material layer on said VAE-based layer; and depositing a formulation comprising a VAE-based material on said first ink material layer and repeating the deposition sequence one or more time to form a layered pattern comprising a plurality of colored ink layers and a plurality of VAE-based material layers.

In some configurations of a process of the invention, the plurality of colored ink layers and the plurality of VAE-based material layers are deposited in sequence to form an alternating stacked pattern of colored ink layers and VAE-based material layers.

In some configurations of a process of the invention, the colored ink formulation comprises at least one pigment selected from white and non-white pigments.

In some configurations of a process of the invention, the process comprising deposition of two or more different color ink formulations, to form a pattern having differently colored layers.

In some configurations of a process of the invention, the color ink formulation comprises a white ink, a dye-based ink, a pigment-based ink, a thermally activated ink, and/or a functional ink and optionally an additive.

In some configurations of a process of the invention, the additive is selected from rheology modifiers, defoamers, softeners, latent acids, latent bases, preservatives, biocides, wetting agents/surfactants, activating agents, polymerizing or crosslinking agents, alkali soluble agents, penetrating agents, wax materials, pH-adjusting agents, isocyanates or block isocyanates, carbodiimides, polycarbodiimide, epoxy crosslinking agent, organic or inorganic acids and bases, polyvinyl alcohol (PVOH), ethylene-vinyl acetate (EVA), polyvinyl acetate (PVAc), ethylene-vinyl alcohol (EVOH), cellulose and derivatives thereof, polyurethane, acrylate, styrene-acrylic copolymer, and dispersions or emulsions thereof.

In some configurations of a process of the invention, the color ink formulation is free of VAE or a derivative thereof.

In some configurations of a process of the invention, the process comprising forming a recipient layer on a surface region of the substrate, wherein said forming comprises deposition by brushing, spraying, printing, or digital inkjet printing.

In some configurations of a process of the invention, the recipient layer is a VAE-based material layer, the layer is formed by a non-inkjet method or a method different from digital inkjet printing.

In some configurations of a process of the invention, the surface region is any region of a substrate surface or the substrate's complete surface.

In some configurations of a process of the invention, the surface region or the substrate is of a material selected from a fabric, a plastic or a polymeric material or any material comprising same.

In some configurations of a process of the invention, the surface region of a substrate is of an absorptive or a non-absorptive material, a natural or a synthetic material, a paper-based material or a polymeric material.

In some configurations of a process of the invention, the substrate is a fabric comprised of or formed of polyester fibers, polyurethane fibers, polyethylene fibers, polyamide fibers, polyacryl fibers, polybenzimidazole fibers, Nylon, Dacron fibers, Modacryl fibers, Rayon fibers, Viscose Rayon fibers, acetate fibers, Saran fibers, Spandex fibers, Vinalon fibers, Aramid fibers, Elastane fibers, cellulose fibers, linen fibers, Flax fibers, Hemp fibers, cotton fibers, silk fibers, or wool fibers.

In some configurations of a process of the invention, the process comprising heating the surface region to a predefined temperature intermittently or continuously, prior to, during, or after material deposition or layer forming.

In some configurations of a process of the invention, each deposited layer is separately dried or cured.

In some configurations of a process of the invention, each layer is deposited on a previous layer that has been cured or dried.

In some configurations of a process of the invention, the process comprising:

(a) forming a recipient layer on a surface region of the substrate by depositing an aqueous solution comprising an ink fixation agent and optionally a VAE-based material;

(b) curing or drying said recipient layer;

(c) forming by inkjet printing a layer of at least one water-based color ink formulation on a region of the recipient layer or on a region of a preformed cured or dried layer of same or different color ink formulation;

(d) curing or drying said layer of at least one color ink formulation; and repeating steps (c) and (d) one or more times to form the layered pattern.

In some configurations of a process of the invention, the process comprising (a) forming a recipient layer by depositing an aqueous solution comprising an ink fixation agent and optionally a VAE-based material.

(b) curing or drying said recipient layer;

(c) forming by inkjet printing a layer of at least one color ink formulation on a region of the recipient layer or on a region of a preformed cured or dried layer of same or different color ink formulation or on a preformed recipient cured or dried layer;

(d) curing or drying said layer of at least one color ink formulation;

(c) forming a recipient film on the surface of the cured or dried layer of the at least one colored ink;

(f) curing or drying said recipient and/or chemically reactive film; and repeating steps (c) through (f) one or more times to form the layered pattern.

In some configurations of a process of the invention, each of the colored ink layers is white, and the process comprises forming a colored top layer.

In some configurations of a process of the invention, the process comprising forming a top layer or a topcoat on the pattern, the top layer or topcoat being a non-white colored image, a layer of a surface modifying material, a layer of a glossy or a matt material and/or a layer of a protective material.

In some configurations of a process of the invention, the process comprising forming a glossy or a matt top layer.

In some configurations of a process of the invention, a matt layer imparts a matt finish to parts or regions of the textured pattern or to a complete surface of the textured pattern.

In some configurations of a process of the invention, the matt finish is achievable by forming surface microfeatures, wherein the microfeatures are embedded in one or more of the pattern top layers.

In some configurations of a process of the invention, the microfeatures are formed by deposition of silica particles, and/or a material nano and/or microparticles, and/or a white ink comprising a metal salt, wherein the material is silica, clay, or a resin.

In some configurations of a process of the invention, the process is a digital inkjet printing process for forming a textured wallpaper.

The invention also provides a digital inkjet printing process for forming a textured 2.5D pattern on a surface region of a substrate, the process comprising forming on a surface region of a substrate a recipient layer comprising VAE or a derivative thereof and an ink fixation agent, and sequentially depositing on said recipient layer a plurality of color ink formulations to form a 2.5D pattern having a preselected design; wherein the 2.5D pattern optionally comprises a plurality of intermediating recipient layers, each formed between any two layers formed from the color ink formulations and wherein each of the plurality of intermediating recipient layers comprises VAE or a VAE derivative and an ink fixation agent.

In some configurations of a process of the invention, the process comprising forming a top layer on the textured 2.5D pattern.

In some configurations of a process of the invention, the top layer is formed by inkjet printing or a deposition method other than inkjet printing.

The invention further provides an object having a 2.5D image on a surface region thereof, wherein the image is formed by a process according to the invention.

In some configurations of the invention, the object is wallpaper.

In some configurations of the invention, the object is a 3D object or a flat object.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

As disclosed herein, the technology of the present application concerns a digital inkjet printing process for forming a textured pattern or image on a surface region of a substrate, wherein the process comprised forming by inkjet printing a layered pattern which may be formed of few to many layered materials, which position and shape, as well as composition are selected to provide a preselected 2.5D design. The textured 2.5D design or pattern or image may be formed directly on a surface region of a substrate or on a mediating layer, such as a based layer, as disclosed herein. The final structured 2.5D design may be formed as a colored or white design, as a matt design, as a glossy design, as a coated design or as a patterned design, wherein any layer formation steps are achievable using various deposition methods including mechanical methods, such as brushing and spraying, and/or printing methodologies such as inkjet printing.

A process according to some embodiments of the invention is exemplified.

Figure 1:
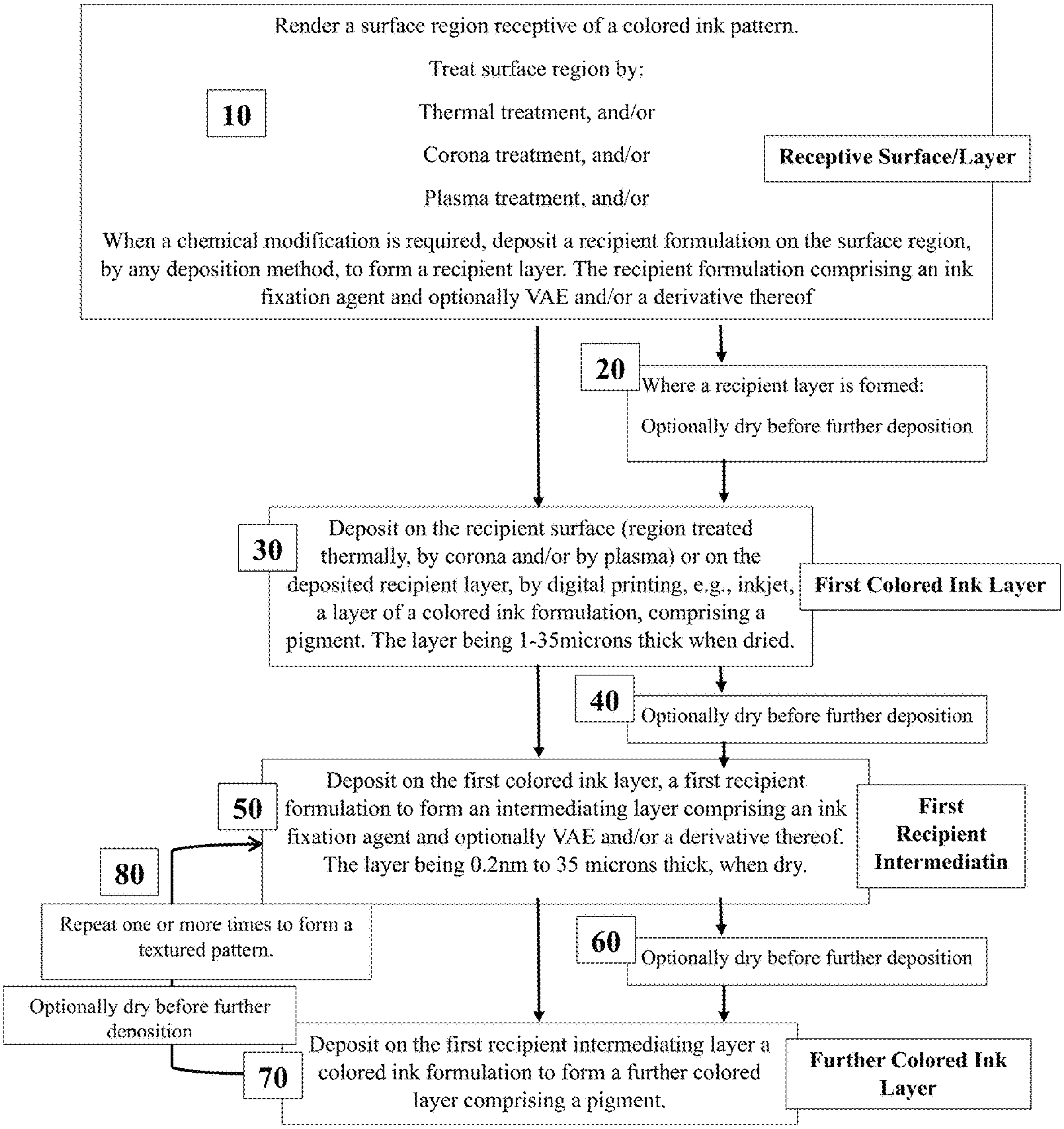
FIG. 1 is a flowchart depicting a process according to some embodiments of the invention for preparing a 2.5D visual and textured pattern on a substrate.

As generally depicted in FIG. 1, a substrate material 10 such as a paper material or a polymeric material may be pretreated thermally and/or under corona or plasma conditions to render the surface receptive of an ink formulation. In cases where the surface requires chemical modification, a recipient layer may be formed thereon. The recipient layer may be formed by any deposition means including such that are not or do not involve inkjet printing. Deposition methods may include spraying, brushing, printing and dipping.

As desired, the complete surface or a part thereof or a region thereof may be coated or treated as disclosed.

The recipient layer may be formed by deposition of a water-based recipient formulation that comprises water and at least one ink fixation agent, such as a cationic material, e.g., calcium chloride or calcium acetate. In some cases, the recipient formulation may also include a polyquaternary polymer and/or VAE or a derivative thereof.

The Recipient Surface or Recipient Layer is subsequently dried 20 or may be deposited on while it is wet or partially wet. The conditions and protocol of deposition may therefore proceed by deposition of a First Colored Ink Layer 30 on the recipient surface or layer 20, and may subsequently be followed by sequential deposition of further colored ink formulations to form a plurality of colored layers. It should be noted that while the colored ink formulation may comprise a pigment, it may nevertheless result in a transparent or a lightly colored layer or a white layer that may be matt or glossy, have a rough surface or a smooth surface, or any surface texture.

Following deposition of the first colored layer 30, the colored layer is optionally allowed to dry 40 before another recipient formulation is deposited to form a First Recipient Intermediating Layer 50. The intermediating layer 50 may be formed on the full colored layer 30 or on a surface region thereof, wherein the shape and size covered by the intermediating layer may coincide or match the shape and size of the colored layer to be followed, namely a Further Colored Ink Layer 70.

The deposition sequence may proceed and each of the deposition layers may be repeated 80 to provide a 2.5D pattern.

Following deposition of each of the material layers, the layer may be dried.

Figure 2:
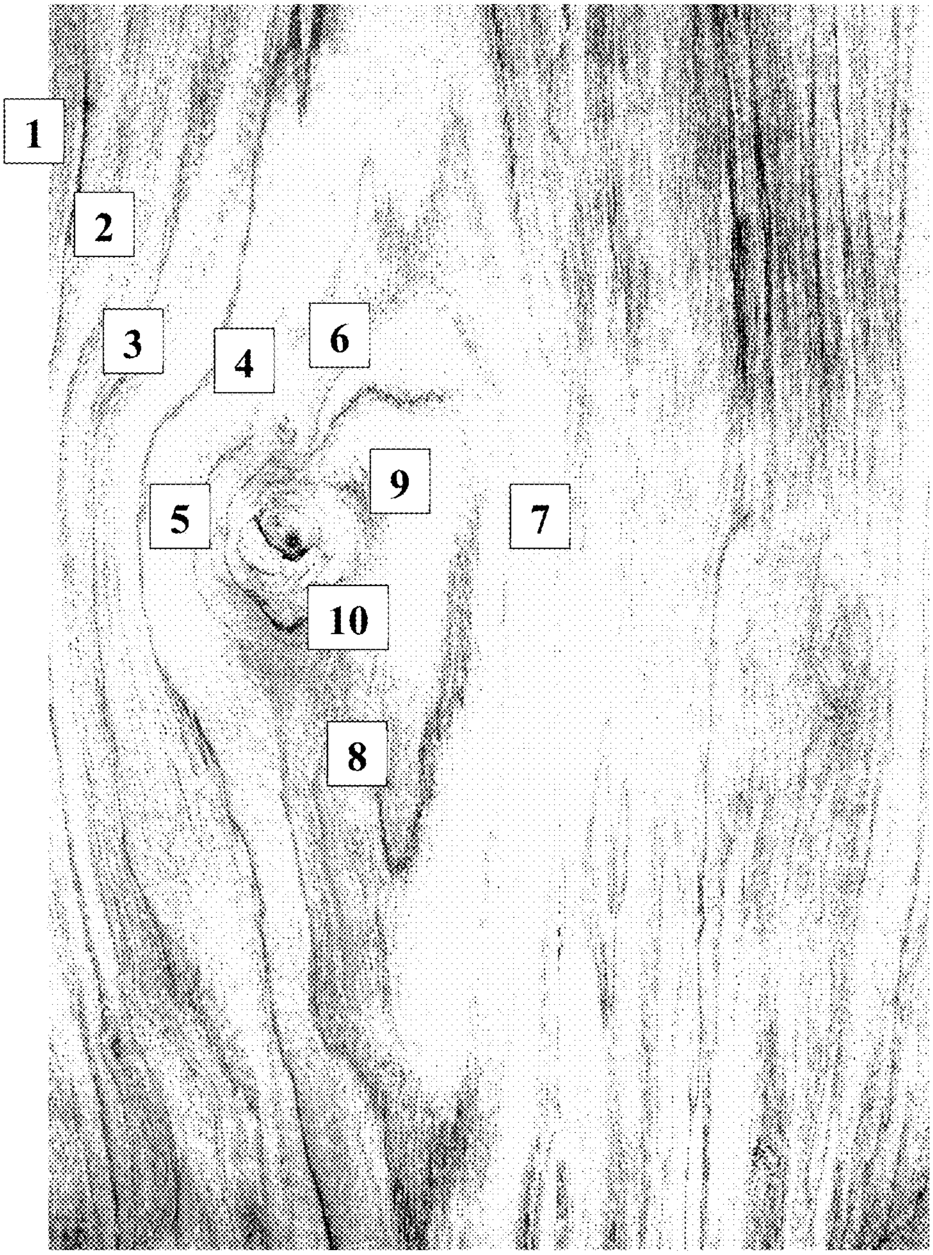
FIG. 2 depicts a 2.5D pattern visual of a wood surface having a thickness of less than 500 μm and formed of a plurality of layers, 10 of which are visible and labeled. Each of the visible layers occupies a different surface region and has a different shape and size (namely has a different layer profile). Each of the plurality of colored layers is separated by a layer of an intermediate layer comprising a fixation agent.

FIG. 2 shows a printed wood-like textured pattern with a thickness that is smaller than 500 microns. The number of deposition layers was greater than 10. Ten of these deposited layers are labeled 1 through 10, are visible as they are of different layer profiles, namely they have different shapes and sizes. The layer-by-layer deposition starting with layer 1 through layer 10 permits the visible contour and texture. Each of the visible layers, as are some of the other invisible layers, is formed of a colored ink formulation that comprises a white or a non-white pigment (namely any colored pigment, including, for example, black, yellow, cyan, magenta, orange, brown, red, violet, blue, green, fluorescent, metal powder and others as disclosed herein), rendering the pattern slightly colored, mimicking a texture and an appearance of a wood surface.

To permit maximum fixation of one colored layer to another, an intermediating layer of a recipient formulation is deposited after each colored layer has been formed. The alternating sequence allows for an improved robust pattern.

Figure 3:
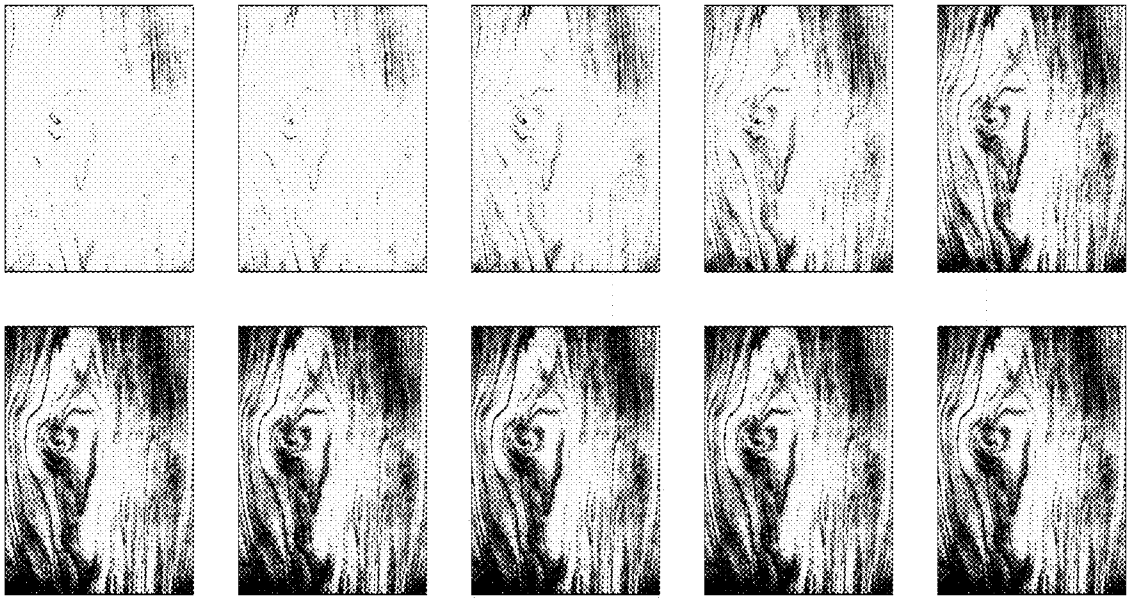
FIG. 3 shows from left to right 10 individual and different layer patterns (labeled 1 through 10), each having a different profile (i.e., shape, size etc). The first pattern (1) is formed on a surface region of a substrate. The next layer pattern (2) is formed on the first layer, and so forth. The layer-by-layer deposition yields a wood-like surface as shown in FIG. 2. Black areas indicate regions of the pattern not formed (not deposited). White areas indicate material deposition.

The layer profile was predetermined prior to material deposition (e.g., ink jetting). The layer profile of each of the 10 layers (labeled 1 through 10) is demonstrated in FIG. 3. From top left to right, each photo depicts the layer deposited. The dark regions are not deposited by a colored ink and/or a recipient formulation, while the white regions are deposited with a material. Layer by layer deposition of the patterns (1 on the substrate surface, 2 on top of 1, 3 on top of 2 . . . etc) affords a texture or a visual as depicted in FIG. 2. The thickness of the pattern was less than 500 microns.

A topcoat was formed on the pattern to render the pattern with a matt appearance. The matt appearance was formed by brushing or spraying the formed pattern with a topcoat formulation comprising silica particles. Alternatively, the last deposited ink layers, or few of the top layers may be formed with nanoparticles or microparticles which form nano or microfeatures that render the surface matt. In a similar way, a varnish layer may be formed to render the pattern glossy.

Each of the colored layers formed by inkjet deposition is typically 1 to 35 microns thick, when dry. Each of the recipient layers measured 0.2 nm to 35 microns in thickness.

The layer thickness may be controlled by setting the printing unit to operate under conditions allowing layer printing of a particular thickness. As explained herein, the layer thickness is the layer height that is essentially the vertical resolution of the z-axis. Thus, when wishing to determine the thickness of the layers or the overall pattern, the vertical resolution or step resolution may be determined.

In other words, to determine the dry thickness of each of the layers, or the pattern as a whole, techniques such as scanning electron microscope (SEM), ellipsometry, electromagnetic measurements, topographic methods, interference microscope, mechanical profiler, X-ray reflectometry (XRR) and others may be used.

Pre-Printing Step

Alternative I—physical treatment of a substrate's surface, such as a wallpaper substrate, involved one or more of corona, plasma and heating treatment. In cases heating was involved, both or either the top face or the bottom face of the substrate where thermally treated. Once treatment was completed, a 2.5D pattern was formed on the surface of the substrate.

Alternative II—In addition to a physical treatment or as an alternative to a physical treatment, the surface was coated by brushing or spraying or by printing or by inkjet printing with a base solution that comprised an ink fixation agent, such as $CaCl_2$ solution with a surfactant. Once the base layer solidified, or partially solidified, following some heating of the substrate, a 2.5D pattern was formed on the solidified, or partially solidified base layer.

Base formulations comprising a calcium salt, either calcium chloride or calcium acetate and VAE were also applied to form a receptive surface on the substrate.

Printing Step

Immobilized high quality 2.5D image was formed directly on a pretreated surface of the substrate or on a base layer formed on the surface of the substrate.

The 2.5D structure was formed by repeated layer-by-layer deposition of materials layers, following a predesigned printing protocol aimed to provide an immobilized printed image. At least two different ink formulations were used: a white ink formulation and a salt solution comprising a calcium salt and a surfactant. In some cases, the salt solution was identical to the base formulation used for forming a base layer. In other cases, the salt solution was different from the base formulation.

In sequence, the 2.5D structure was formed by first depositing by inkjet printing a first layer of the white ink formulation, following deposition of the salt solution, and the alternative layer deposition was repeated until the 2.5 structure was achieved. Typically, each of the deposited layers was dried or cured, at least partially, to increase the surface viscosity and permit deposition of a subsequent material layer. Curing was achieved by heating while printing each layer, from below the substrate (conventional) and/or from above the printed layers by conventional and or IR lamps. Suitable IR lamps include medium or NIR lamps, which are mounted on the sides of the print head carriage. The substrate was heated to a temperature not exceeding 60° C.

In some cases, air or hot air was also applied to induce water evaporation.

Once the 2.5D structure is formed, a topcoat may be formed, by any deposition means, not necessarily by inkjet printing, to impart color or texture to the structure. Optionally, the topcoat is formulated with an abrasion resistance material to provide protection against abrasion and or chemical damage. Optionally, the topcoat is formulated with silica and/or other materials as described above (nano size and/or micron size) particles to impart a matt finish or appearance to the image. Alternatively or additionally, matt appearance may be achievable by forming surface microfeatures, e.g., by inkjet printing such features into the several upper layers and/or the topmost layer.

The final structure was finally heated in an oven at a temperature of 95° C., for a period of several minutes.

The final heating may be applied from below the substrate (conventional) and or from above the printed 2.5D image (conventional and or IR lamps, for example: medium or NIR lamps). Air, e.g., hot air, may also be used from above the printed 2.5D image for venting and accelerating water and/or vapor removal.

2.5D patterns were formed by a Ricoh model Ri 1000 inkjet printing unit, equipped with a heating element under its flatbed to allow heating the substrate to 60° C. Hot air was also used from above the substrate to accelerate the drying of each of the layers applied. The final printed 2.5D sample was further heated in an oven to 95° C. for a period of several minutes.

Figure 4:
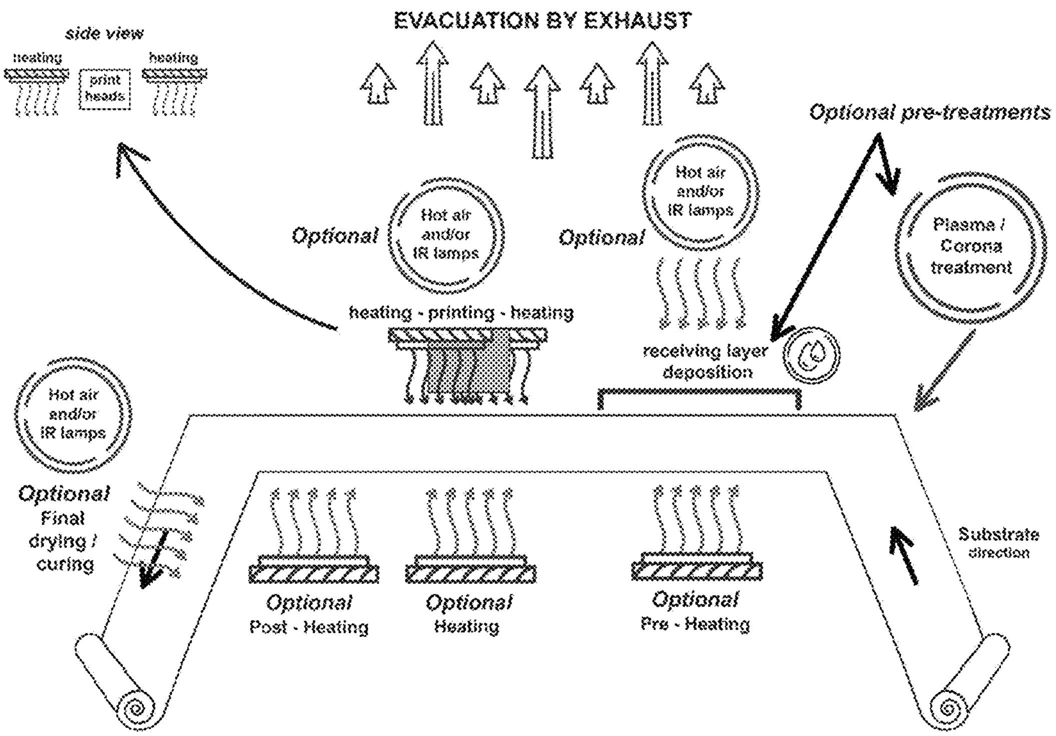
FIG. 4 depicts an exemplary roll to roll printing process for producing 2.5D images according to the invention.

Other commercial printing systems may be used. Such include for example roll-to-roll printers that may be adapted to the process described herein and, in the general, used to carry out the printing scheme of FIG. 4.

The invention claimed is:

1. A digital inkjet printing process for forming a 2.5D pattern on a surface region of a substrate, the process comprising depositing a water-based color ink formulation on a substrate having a cured or dry recipient surface region to thereby form a layered 2.5D pattern comprising an ink-jetted plurality of material layers structured to adopt the 2.5D pattern with a preselected design; wherein the water-based ink formulation optionally containing a pigment, the 2.5D pattern having a thickness of not greater than 1 mm, wherein the process does not comprise deposition of UV-based ink formulations or UV-irradiation steps, and wherein the recipient surface is formed by deposition of a water-based recipient formulation and curing or drying said deposited water-based recipient formulation; the water-based recipient formulation consisting of water, an ink fixation agent, a surfactant and a vinyl acetate/ethylene copolymer (VAE)-based material selected from the group consisting of VAE and a VAE derivative wherein the ink fixation agent is selected from a metal salt, an ammonium salt, a sulfonium salt, a phosphonium, a polyethyleneimine salt, a polyvinyl amine salt, a polyallyl amine salt, a polydimethyl aminoethyl methacrylate quaternary salt, a polydiallyl dimethyl ammonium salt, a diallylamine acrylic amide copolymer salt, and a quaternary ammonium salt of polystyrene.

2. The process according to claim 1, wherein the thickness of the pattern is between 200 and 500 microns.

3. The process according to claim 1, comprising between 2 and 50 layers.

4. The process according to claim 1, wherein the 2.5D pattern formed on the recipient surface comprises a plurality of stacked material layers separately formed from recipient ink formulations and color ink formulations deposited in sequence.

5. The process according to claim 4, wherein a color ink formulation is deposited on the recipient surface to form a first colored layer, subsequently a further recipient formulation is deposited on the first colored layer to form a first intermediating material layer, followed by deposition of a further color ink formulation on the first intermediating layer, wherein further color ink formulations and further recipient ink formulations are deposited in sequence, wherein each of the further recipient ink formulations and each of the color ink formulation having same or different composition, each of the layers having same or different layer profiles, and wherein the further recipient formulation comprises water, an ink fixation agent, a surfactant and a vinyl acetate/ethylene copolymer (VAE)-based material selected from the group consisting of VAE and a VAE derivative; wherein the ink fixation agent is selected from a metal salt, an ammonium salt, a sulfonium salt, a phosphonium salt, a polyethyleneimine salt, a polyvinyl amine salt, a polyallyl amine salt, a polydimethyl aminoethyl methacrylate quaternary salt, a polydiallyl dimethyl ammonium salt, a diallylamine acrylic amide copolymer salt, and a quaternary ammonium salt of polystyrene.

6. The process according to claim 5, for forming a 2.5D pattern having a design wherein not all layers forming the design are of the same profile.

7. The process according to claim 1, wherein the ink fixation agent is or comprises a metal salt of a metal selected from sodium, calcium, aluminum, copper, zinc, cobalt, nickel, and magnesium.

8. The process according to claim 7, wherein the recipient surface is a recipient layer formed on the substrate, the layer comprising a calcium salt.

9. The process according to claim 1, wherein the ink fixation agent is an ammonium salt or a polyquaternary ammonium salt.

10. The process according to claim 9, wherein the ammonium salt is selected from polidronium chloride, poly[bis(2-chloroethyl) ether-alt-1,3-bis[3-(dimethylamino)propyl] urea] quaternized, poly(diallyldimethylammonium chloride), poly(acrylamide-co-diallyldimethyl ammonium chloride) and nonanediamide N,N'-bis(3-(dimethylamino) propyl)-polymer with 1,1'-oxybis(2-chloroethane).

11. The process according to claim 1, the process comprising:

forming a recipient layer of a VAE-based material on said surface region, wherein said recipient material layer comprises at least one ink fixating agent and a surfactant;

depositing a color ink formulation on a region of said layer of a VAE-based material, being optionally dry, to form a first ink material layer on said VAE-based layer; and depositing an aqueous formulation comprising an ink fixation agent, a surfactant and a VAE-based material on said first ink material layer and repeating the deposition sequence one or more time.

12. The process according to claim 1, wherein the color ink formulation comprises a white ink, a dye-based ink, a pigment-based ink, a thermally activated ink, and/or a functional ink and optionally an additive selected from rheology modifiers, defoamers, softeners, latent acids, latent bases, preservatives, biocides, wetting agents/surfactants, activating agents, polymerizing or crosslinking agents, alkali soluble agents, penetrating agents, wax materials, pH-adjusting agents, isocyanates or block isocyanates, carbodiimides, polycarbodiimide, epoxy crosslinking agent, organic or inorganic acids and bases, polyvinyl alcohol (PVOH), ethylene-vinyl acetate (EVA), polyvinyl acetate (PVAc), ethylene-vinyl alcohol (EVOH), cellulose and derivatives thereof, polyurethane, acrylate, styrene-acrylic copolymer, and dispersions or emulsions thereof.

13. The process according to claim 1, wherein the surface, the surface region or the substrate is of a material selected from a fabric, a plastic or a polymeric material or any material comprising same.

14. The process according to claim 1, wherein the surface region of a substrate is of an absorptive or a non-absorptive material, a natural or a synthetic material, a paper-based material or a polymeric material.

15. The process according to claim 14, wherein the substrate is a fabric comprised of or formed of polyester fibers, polyurethane fibers, polyethylene fibers, polyamide fibers, polyacryl fibers, polybenzimidazole fibers, Nylon, Dacron fibers, Modacryl fibers, Rayon fibers, Viscose Rayon fibers, acetate fibers, Saran fibers, Spandex fibers, Vinalon fibers, Aramid fibers, Elastane fibers, cellulose fibers, linen fibers, Flax fibers, Hemp fibers, cotton fibers, silk fibers, or wool fibers.

16. The process according to claim 1, the process comprising:

(a) forming the recipient layer on a surface region of the substrate by depositing an aqueous solution consisting of an ink fixation agent, surfactant and a VAE-based material;

(b) curing or drying said recipient layer;

(c) forming by inkjet printing a layer of at least one water-based color ink formulation on a region of the recipient layer or on a region of a preformed cured or dried layer of same or different color ink formulation;

(d) curing or drying said layer of at least one color ink formulation; and repeating steps (c) and (d) one or more times to form the layered pattern.

17. The process according to claim 16, the process comprising (a) forming a recipient layer by depositing an aqueous solution consisting of an ink fixation agent, surfactant and a VAE-based material;

(b) curing or drying said recipient layer;

(c) forming by a layer of at least one color ink formulation on a region of the recipient layer or on a region of a preformed cured or dried layer of same or different color ink formulation or on a preformed recipient cured or dried layer;

(d) curing or drying said layer of at least one color ink formulation;

(e) forming a recipient film on the surface of the cured or dried layer of the at least one colored ink;

(f) curing or drying said recipient and/or chemically reactive film; and repeating steps (c) through (f) one or more times to form the layered pattern.

18. The process according to claim 1 for forming a textured 2.5D pattern on a surface region of a substrate, the process comprising forming on a surface region of a substrate the recipient layer, and sequentially depositing on said recipient layer a plurality of color ink formulations to form a 2.5D pattern having a preselected design; wherein the 2.5D pattern optionally comprises a plurality of intermediating recipient layers, each formed between any two layers formed from the color ink formulations and wherein each of the plurality of intermediating recipient layers consisting of water, an ink fixation agent, a surfactant and a vinyl acetate/ethylene copolymer (VAE)-based material.

19. The process of claim 1, wherein the recipient layer is formed by inkjet.

20. An image formed according to the process of claim 1.

21. A digital inkjet printing process for forming a 2.5D pattern on a surface region of a substrate, the process comprising depositing a water-based color ink formulation on a substrate having a recipient surface region to thereby form a layered 2.5D pattern comprising an ink-jetted plurality of material layers structured to adopt the 2.5D pattern with a preselected design; wherein the water-based ink formulation optionally containing a pigment, the 2.5D pattern having a thickness of not greater than 1 mm, wherein the process does not comprise deposition of UV-based ink formulations or UV-irradiation steps, and wherein the recipient surface is formed by deposition of a water-based recipient formulation consisting of water, an ink fixation agent, a surfactant and a vinyl acetate/ethylene copolymer (VAE)-based material selected from the group consisting of VAE and a VAE derivative wherein the ink fixation agent is a combination of two or more ink fixation agents comprising an ammonium salt or a polyquaternary ammonium salt.

22. The process according to claim 21, the water-based recipient formulation consisting of water, the ink fixation agent, the surfactant and the vinyl acetate/ethylene copolymer (VAE)-based material.

23. The process according to claim 21, wherein the combination of the ink fixation agents consists of an ammonium salt or a polyquaternary ammonium salt and an ink fixation agent selected from a metal salt, a sulfonium salt, a phosphonium, and a polyethyleneimine salt.

24. The process according to claim 21, wherein the ammonium salt is selected from polidronium chloride, poly [bis(2-chloroethyl) ether-alt-1,3-bis[3-(dimethylamino)propyl]urea] quaternized, poly(diallyldimethylammonium chloride), poly(acrylamide-co-diallyldimethyl ammonium chloride) and nonanediamide N,N'-bis(3-(dimethylamino) propyl)-polymer with 1,1'-oxybis(2-chloroethane).

* * * * *